(12) United States Patent
Lundahl et al.

(10) Patent No.: US 6,636,862 B2
(45) Date of Patent: Oct. 21, 2003

(54) METHOD AND SYSTEM FOR THE DYNAMIC ANALYSIS OF DATA

(75) Inventors: David S. Lundahl, Corvallis, OR (US); David C. Plaehn, Corvallis, OR (US)

(73) Assignee: Camo, Inc., Woodbridge, NJ (US)

( * ) Notice: Subject to any disclaimer, the term of this patent is extended or adjusted under 35 U.S.C. 154(b) by 137 days.

(21) Appl. No.: 09/899,227

(22) Filed: Jul. 5, 2001

(65) Prior Publication Data

US 2002/0107858 A1 Aug. 8, 2002

Related U.S. Application Data

(60) Provisional application No. 60/216,231, filed on Jul. 5, 2000.

(51) Int. Cl.[7] .............................................. G06F 17/30
(52) U.S. Cl. ...................................................... 707/101
(58) Field of Search .............................. 707/1, 6, 10, 5, 707/101, 102; 709/217; 250/339.12; 704/9

(56) References Cited

U.S. PATENT DOCUMENTS

| 5,325,298 A | * | 6/1994 | Gallant ........................... 704/9 |
| 5,442,778 A | | 8/1995 | Pedersen et al. ................ 707/5 |
| 5,945,675 A | | 8/1999 | Malins .................... 250/339.12 |
| 6,012,058 A | * | 1/2000 | Fayyad et al. .................. 707/6 |
| 6,256,633 B1 | | 7/2001 | Dharap ......................... 707/10 |
| 6,263,334 B1 | | 7/2001 | Fayyad et al. .................. 707/5 |

FOREIGN PATENT DOCUMENTS

| GB | 2215891 A | 9/1989 |

OTHER PUBLICATIONS

Data Clustering: A Review By Jain et al., ACM Computing Surveys, vol. 31, No. 3, Sep. 1999.*
Lee, Daeryong, et al., Modified K–Means Algorithm for Vector Quantizer Design, IEEE Signal PRocessing Letters, Jan. 1997, p. 2–4, vol. 4, Issue 1.
Newton, S.C., et al., Adaptive Fuzzy Leader Clustering of Complex Data Sets in Recognition, Neural Networks, IEEE Transactions On, Sep. 1992, vol. 3 Issue 5, p. 794–800.
Rose, K., et al., Hierarchical Clustering Using Deterministic Annealing, Neural Networks, 1992, IJCNN, Internation Joint Conference on, Jun. 1992, vol. 4, p. 85–90.
Lee, Daeryong et al., Generalization of the Codebook Updating Method of the k–Means Algorithm, Communications 1999, APCC/DECC '99 Fifth Asia Conference on . . . And Forth Optoelectronics and Communications, Oct. 1999, vol. 1, p. 566–569.

(List continued on next page.)

Primary Examiner—Diane D. Mizrahi
Assistant Examiner—Apu M Mofiz
(74) Attorney, Agent, or Firm—Stites & Harbison, PLLC; David W. Nagle, Jr.

(57) ABSTRACT

In a method and system for the dynamic analysis of data represented in distinct matrices, if two data matrices X and Y are present in which corresponding rows of X and Y each refer to the same underlying object, a relationship can developed between the X and Y data matrices, which allows for a prediction of responses in Y on the basis of inputted X-data. And, if a third data matrix Z is present in which corresponding columns of Y and row of Z each refer to the same underlying object, a relationship can developed between the X Y and Z data matrices, which allows for link between X and Z through Y.

20 Claims, 16 Drawing Sheets

OTHER PUBLICATIONS

Zamir, Owen et al., Web document clustering: a feasibility demonstration, Proceedings of the 21st annual international ACM SIGIR conference on Research and development in information retrieval, Aug. 24–28, 1998, p. 46–54, Melbourne, Australia.

Anick, Peter G. et al., Exploiting clustering and phrases for context–based information retrieval, Proceedings of the 20th annual international ACM SIGIR conference on Research and development in information retrieval, Jul. 27–31 , 1997, p. 314–323, Philadelphia, Pennsylvania, USA.

International Search Report for International Application No. PCT/US01/21663, mailed Nov. 15, 2001.

Dayal, Bhupinder, S. and Macgregor, John F.; Recursive exponentially weighted PLS and its application to adaptive control and prediction: J. Proc. Cont. vol. 7, No. 3, pp. 169–179 (1997) (Elsevier Science Ltd., Great Britain).

Mao, Jianchang and Jang, Anil K.; A Self–Organizing Network for Hyperellipsoidal Clustering; IEEE Transactions on Neural Networks, vol. 7, No. 1 (1996).

Dubes, Richard C.; How Many Clusters are Best?—An Experiment; Pattern Recognition; vol. 20, No. 6, pp. 645–663 (1987) (Pergamon Journals Ltd., Great Britain).

Geladi, Paul and Kowalski, Bruce R.; Partial Least Squares Regression: A Tutorial; Analytical Chimica Acta, 185 (1986) 1–17 (Elsevier Science Publishers B.V., Amsterdam).

Kohdnen, Teuvo; Self–Organized Formation of Topologically Correct Feature Maps; Biol. Cybern. 43, 59–69 (1982).

Sjostrom, Michael and Wold, Svante; Simca: A Pattern Recognition Method Based on Principal Component Models; Pattern Recognition in Practice, pp. 351–359 (1980) (North–Holland Publishing Company).

* cited by examiner

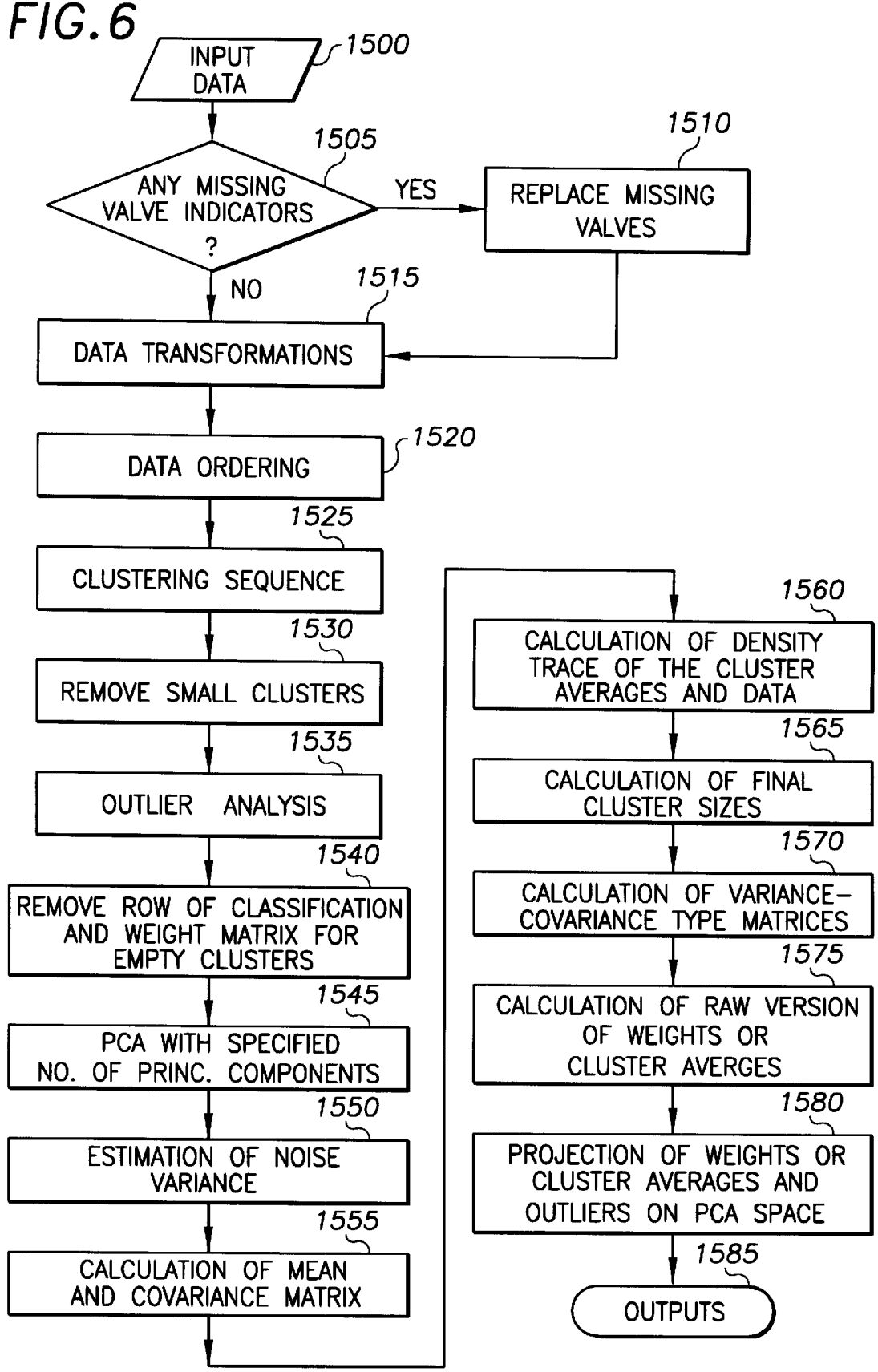

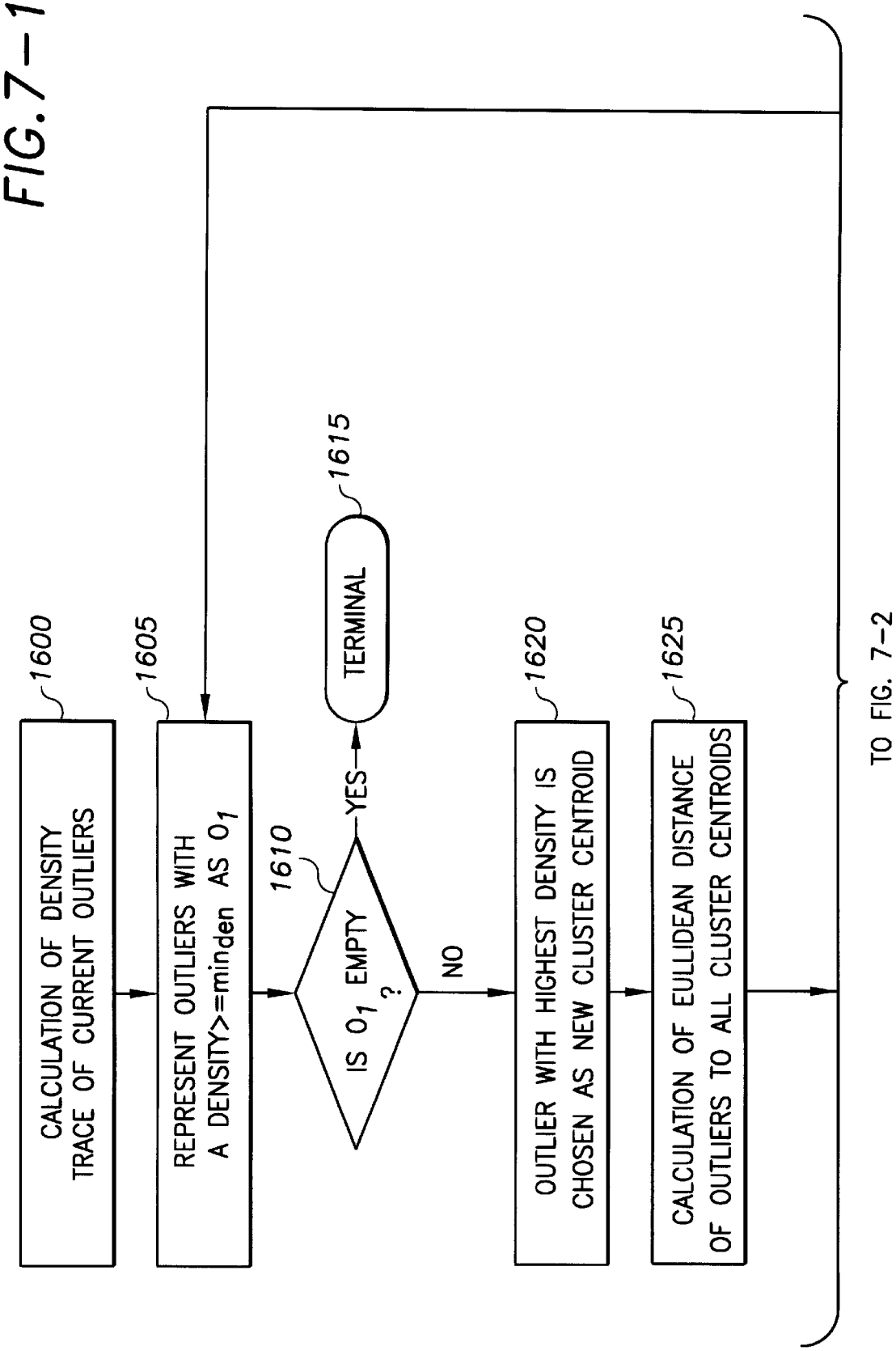

METHOD AND SYSTEM FOR THE DYNAMIC ANALYSIS OF DATA

The present application claims priority from U.S. provisional application No. 60/216,231 filed Jul. 5, 2000.

FIELD OF THE INVENTION

This application relates to a method and system for the dynamic analysis of data, especially data represented in distinct matrices, for example, X, Y and Z data matrices. If two data matrices X and Y are present in which corresponding rows of X and Y each refer to the same underlying object, a relationship can developed between the X and Y data matrices, which allows the method and system of the present invention to predict responses in Y on the basis of inputted X-data. And, if a third data matrix Z is present in which corresponding columns of Y and rows of Z each refer to the same underlying object, a relationship can developed between the X, Y and Z data matrices, which allows the method and system of the present invention to link X with Z through Y.

BACKGROUND OF THE INVENTION

Again, this application relates to a method and system for the dynamic analysis of data, for example, data related to consumer choice modeling or quality control programs.

Advances in computerization and other technologies have greatly facilitated the collection of data. However, once data has been collected, entities are often faced with new problems and challenges related to the analysis and use of the accumulated data. If there is not an effective method and system for storing, updating, and analyzing the accumulated data, its value is minimal. Such problems and challenges are compounded by the desire of entities to gain a better understanding of the complex relationships inherent in the data, and the further desire of entities to access and analyze such relationships, particularly in the real-time world of global computing and the Internet.

In response, various "data mining" or "knowledge extraction" methods and systems have been developed to assist in extracting conclusions and answers from accumulated data. Specifically, such data mining and knowledge extraction methods and systems use approaches for cleaning data sets, coding data values, deriving secondary attributes, developing relationships and classes, and reporting. In this regard, a wide range of statistical and artificial intelligence methods is used in connection with such approaches. Despite the approach or combination of approaches used, the goal is ultimately to provide useful conclusions through an analysis of the accumulated data.

Perhaps one of the best examples of the use of data mining or knowledge extraction is in the consumer products industry. As can be expected, competition is fierce in the manufacture and marketing of consumer products. Manufacturers of consumer products expend great resources in identifying the preferences and attitudes of their targeted markets. In so identifying these preferences and attitudes, manufacturers of consumer products often accumulate vast amounts of raw data. As discussed above, without an appropriate analysis of the data, its value is minimal.

Current data mining and knowledge extraction techniques, however, are not always effective. One of the primary problems is the pace at which consumer preferences and attitudes shift and change. Many of the prior art analysis tools can not rapidly adapt to changing market conditions. For example, a manufacturer may accumulate twelve months worth of raw data regarding consumer preferences, create a consumer preference model through an analysis of that data, and then package and market its new product accordingly. However, since the manufacturer did not account for the dynamics of the marketplace, the shifting and changing of consumer preferences, its model may prove ultimately ineffective.

Furthermore, prior art approaches commonly are designed to can relate two types of at objects (i.e., row and column objects) on the basis of some measure, e.g., correspondence analysis, principal components analysis, and factor analysis. While such approaches assist in developing an understanding of data relationships or associations, they do not allow for the incorporation of the respective independent qualities of objects into models, qualities that that define predictive (e.g., cause and effect) relationships between independent objects. Similarly, prior art approaches do not allow for the grouping of segments of objects of one type with respect to some measure on another set of objects of another type, nor do they allow for the use of the qualities of the respective objects to build predictive models relating the qualities of the two respective types of objects.

It is therefore a paramount object of the present invention to provide a method and system for the dynamic analysis of data that overcomes the inefficiencies and shortcomings of prior art methods and systems, a method and system that allow for the incorporation of the respective independent qualities of objects into models, qualities that that define predictive relationships between independent objects.

This and other objects and advantages of the present invention will become apparent upon a reading of the following description.

SUMMARY OF THE INVENTION

The present invention is a method and system for the dynamic analysis of data that is comprised of a series of computational steps achieved through the use of a digital computer program. Specifically, there are three phases of the preferred dynamic data analysis. In the first phase, a cluster analysis or clustering sequence is performed on a data matrix Y in order to segment the data into appropriate clusters for subsequent computational analysis. The second phase is a modeling phase. If a second data matrix X is present such that corresponding rows of X and Y each refer to the same underlying object, in the second phase, a relationship can developed between the X and Y data matrices, which allows the method and system of the present invention to predict responses in Y on the basis of inputted X-data. The third phase is also a modeling phase. If a third data matrix Z is present in which corresponding columns of Y and row of Z each refer to the same underlying object, a relationship can developed between the X Y and Z data matrices, which allows the method and system of the present invention to link X with Z through Y.

DESCRIPTION OF THE DRAWINGS

FIG. 6 is a flow chart detailing calibration of a cluster model in accordance with the method and system of the present invention;

DETAILED DESCRIPTION OF THE INVENTION

Figure 1:
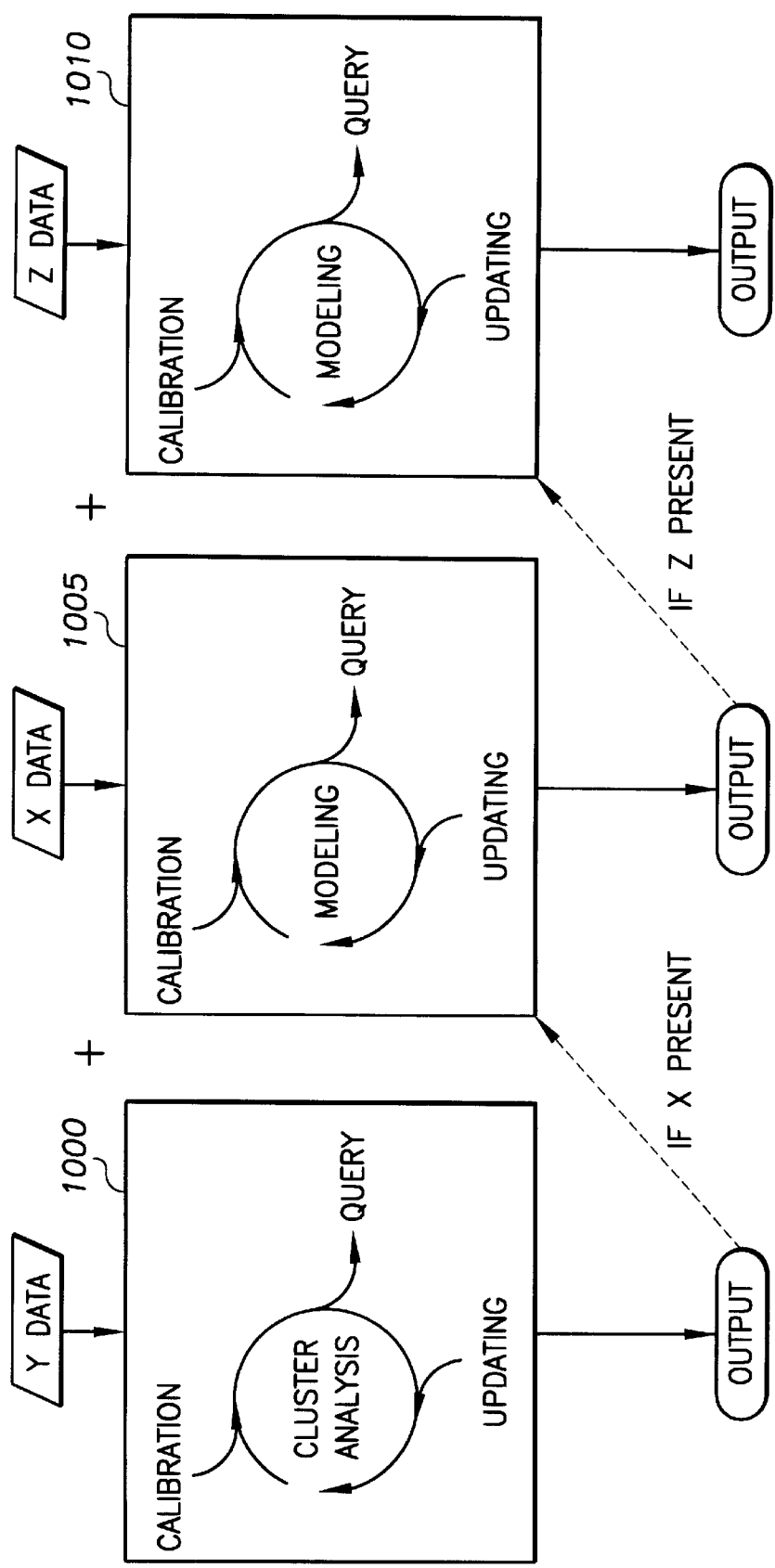
FIG. 1 is a schematic depiction of the three phases of the dynamic data analysis in the method and system of the present invention.

The present invention is a method and system for the dynamic analysis of data that overcomes the inefficiencies and shortcomings of prior art methods and systems, a method and system that allow for the incorporation of the respective independent qualities of objects into models, qualities that that define predictive relationships between independent objects.

Definitions and Notation

For purposes of describing the method and system of the present invention, the following definitions and notation are used:

Matrices are generally represented by bold-faced, upper case letters, e.g., X, Y, Z. However, a single row or column matrix is generally represented by bold-faced, lower case letters, e.g., x, y, z.

The element of the matrix M in the ith row and jth column is denoted by $M(i,j)$.

The ith element of a vector v is denoted by $v(i)$ or $v_i$.

The ith row of the matrix M is denoted by $M(i,:)$ and the jth column of M is denoted by $M(:,j)$.

$M(r_1:r_2,:)$ represents the submatrix of M determined by rows $r_1$ through $r_2$. Similarly, $M(:,c_1:c_2)$ represent the submatrix determined by columns $c_1$ through $c_2$.

The notation for matrices can be extended to n-dimensional arrays. For instance, if M were a three-dimensional array, then $M(i,j,k)$ would describe an element of M. The two-dimensional array at "level" k, is denoted by $M(:,:,k)$.

Assuming A and B are n×p and n×q matrices, respectively, the notation C=[A; B] represents a concatenation of A and B such that C(:,1:p)=A and C(:,p+1:p+q)=B. Similarly, if D is a m×p matrix, then E=[A; D] defines a concatenation of A and D such that E(1:n,:)=A and E(n+1:n+m,:)=D.

The transpose of a matrix is denoted by "'", i.e., the transpose of matrix M is M'.

The standard matrix product of two matrices, A and B, is denoted as AB or A*B.

The inverse of a matrix A, if it exists, is denoted by $A^{-1}$.

The Moore-Penrose inverse of a matrix A is denoted as $A^+$. This is an example of a generalized inverse. A generalized inverse of A is denoted as $A^-$. (A matrix may have more than one generalized inverse.)

Assume, for example, A is an n×m matrix:
(i) v=sum(A) is the 1×m vector such that v(j) is equal the sum of the elements of column j of A if n>1, and v is the sum of the elements of A if n=1.
(ii) B=abs(A) is defined as $B(i,j)=|A(i,j)|$.
(iii) var(A) is the sample variance of the rows of A.
(iv) min(a, b) is the minimum of a and b, while min(v) is the minimum of the real-valued components of v.
(v) max(a,b) a is the maximum of a and b, while max(v) is the maximum of the real-valued components of v.

The covariance matrix associated with matrix A, Cov(A), is defined by $A'A/(n-1)$.

A scalar, $\lambda$, is said to be an eigenvalue of an n×m matrix, A, if for some non-null, 1×n vector, v, $Av=\lambda v$. v is an eigenvector associated with $\lambda$.

The notation $f:x \rightarrow y$ means that the function f maps x onto y, or the function f evaluated at x is equal to y. The notation $x \rightarrow y$ connotes the same thing, the underlying function being implicit.

The notation "$\rightarrow$" denotes updating of a quantity, e.g., $x \rightarrow x+t$ means that x is updated by the addition of t.

The symbol "≡" means "is defined as."

A linear space, Y, is a set of objects along with the operations of addition and multiplication by a scalar such that:
(i) if $a \epsilon Y$ and $b \epsilon Y$, then $a+b \epsilon Y$; and
(ii) if $a \epsilon Y$ and k is a scalar, then $ka \epsilon Y$.

An example of a finite dimensional linear space is $\mathfrak{R}^r$ for any positive integer r.

A non-empty, finite set of vectors, $U=\{u_1, u_2, \ldots, u_k\}$ is said to be linearly dependent, if it there exist a set of scalars $x_1, x_2, \ldots x_k$ (not all zero) such that $x_1 u_1 + x_2 u_2 + \ldots + x_k u_k = 0$. If no such set of scalars exist, then U is said to be linearly independent.

The rank of a matrix is maximum number of linearly independent rows (or columns) of the matrix.

A basis for a real, finite dimensional, linear vector space, $\mathfrak{R}^r$, is a set of vectors $\{v_1, v_2, \ldots, v_r\}$ such that if $a \epsilon \mathfrak{R}^r$, then $a = a_1 v_1 + a_2 v_2 + \ldots + a_r v_r$, $a_i$ is a real-valued scalar for $i=1,2, \ldots r$. Thus, every element of $\mathfrak{R}^r$ can be expressed as a linear combination of basis elements.

A basis, V, is orthogonal if $v_i * v_j' = 0$ for $i \neq j$, where '*' is the standard vector dot (matrix) product, and $v_i$, $v_j$ are 1×r basis vectors in V.

A basis, V, is orthonormal if it is orthogonal and $v_1 * v_i' = 1$ for all $v_i \epsilon V$. An orthogonal set of basis vectors is linearly independent.

There are a number of ways to transform data for processing. First, assuming Y is a matrix, mean centering or centering of Y is defined as subtracting the mean of a given column from each element of that column. The resulting matrix has an overall mean of 0 as each column has a mean of zero.

Scaling a matrix Y refers to the division of each entry in a given column by the sample standard deviation of that column. Thus, if A is a scaled matrix, then each column of A has a sample variance or standard deviation of one.

Row-mean-centering refers to the subtraction of the mean of a row from the given row so that each row of the row-mean-centered matrix has a mean of zero.

Root mean square error refers to an estimation error of some sort between an original n×p matrix Y and an estimation of Y, $Y_{est}$. Assuming rmse(i) represents the root mean square error of column i of Y, then $rmse(i) = \sqrt{(Y(:,i)-Y_{est}(:,i))'*(Y(:,i)-Y_{est}(:,i))/n}$, which is the square root of the average square difference between elements of $Y(:,i)$ and $Y_{est}(:,i)$.

RMSEC refers to the root mean square error of calibration, where $Y_{est}$ is the estimated Y of calibration (i.e., a prediction model that is applied to the data with which the model was created, as will be described more fully below).

RMSEP refers to the root mean square error of prediction, where the estimation error is on a data set not used in calibration, e.g., a test set. In the context of the present application, RMSEP represents a measure of the prediction error during the updating of regression models.

Principal components analysis ("PCA") represents a centered n×p matrix, X, as the product of two matrices T and P', i.e., X=T*P'. T is sometimes called a scores matrix, and P is sometimes called a loadings matrix. The rows of P, also called principal components, are orthonormal, and, if X'*X is full rank, form a basis for the rows of X. In fact, the columns of P are eigenvectors of X'*X/(n−1). It is standard practice that the first column (eigenvector) of P corresponds to the largest eigenvalue of X'*X/(n−1), the second row to the second largest eigenvalue, and so on. In this manner, if the rows of X are thought of as points, then the direction of the largest spread of the data is given by the first row of P. The direction of the second largest spread of the data is given by the second row of P, and so on. P is a an transformation matrix in that, through P, the coordinates of points in the original space (i.e., the rows of X) are transformed to the coordinates of a new, rotated space. The rows of T give the coordinates of this new space, X*P=T. One application of PCA is to represent a data set by a lower dimensional one. So, if the rows of X are elements of $\Re^p$, it may be that X≈T(:,1:m)*P(:,1:m)', where m<p. For example, if p=10, it may be that the variance of T(:,1:m), with m=3, is 90% of the variance of X. The first three columns of T could be viewed as representing the real "structure" of X while the remaining 7 columns of T (T(:,4:10)) might be considered "noise," the importance of which will be come clearer in the description of the method and system of the present invention that follows.

Partial least squares ("PLS") is a bilinear method relating two matrices, X and Y. The output of PLS is a scores matrix T, a weight matrix W (not to be confused with the weight matrix for neural networks), X and Y loadings matrices (P and Q respectively), and a regression matrix, $B=W(P'W)^{-1}Q'$. If Y is the dependent matrix and X the independent matrix, the following relationships exist: X=TP'+error, Y=TQ'+error, and Y=XB+error. The number of columns in the T, P, Q and W matrices is called the number of principal components. Various methods, such as leave-k-out cross-validation, can be used to determine the optimal number of principal components.

It is often instructive in PCA and PLS models to determine a measure of "fit." One indicator of this is called explained variance. For example, given a PCA model of an n×p matrix X, A is the number of principal components in the model, with $T_A$ and $P_A$ the respective scores and loadings matrices. In this regard, $T_A$ and $P_A$ each have A columns. Assuming, for purposes of simplicity and clarity, that X is centered, then $E_A = X - T_A P_A'$ is the model error. If $EV_A$ is the explained variance of the model with A principal components, then $$EV_A = 1 - \frac{\text{sum of squares of all the elements of } E_A}{\text{sum of squares of all the elements of } X}.$$

Thus if A=p, then the elements of $E_A$ should be zero or very small, consequently, $EV_p \approx 1$.

The leverage of an object relative to a given model is a measure of the effect of the object on the model. The leverage has a value between zero and one, with a higher value indicating a greater effect. For purposes of this description, leverage is related to PCA and PLS models. For example, let X be a n×q data matrix, and let T be the corresponding n×A scores matrix, where A is the number of principal components in the model. The leverage h(i) of object i is defined by $$h(i) = \frac{1}{n} + \sum_{a=1}^{A} \frac{T(i,a)^2}{T(:,a)'*T(:,a)}$$

SIMCA ("Soft Independent Modeling of Class Analogies") is a classification algorithm that has associated variable descriptors called modeling power and discriminatory power, as well as a measure of class separation. Given a classification of an n×p matrix X, SIMCA makes a PCA model of each class. These models are then used to classify new points. For example, assume that $X_i$ is the matrix of the X-data in class i, i.e., $X_i$ contains those rows of X that are classified as being in group i, i=1,2, . . . g (where g is the number of classes). Assume now that $T_i$ and $P_i$ are the respective PCA scores and loadings for class i with $A_i \leq p$ principal components. Assume that the PCA models are centered with $m_i$ being the mean of $X_i$. Let $r_i$ be the number of rows of $X_i$ (i.e., the number of objects in class i), and let $1_i$ be a $r_i \times 1$ column vector of ones. Finally, assume that any scaling or variable weighting has been done beforehand. Thus, $X_i = 1_i * m_i + T_i * P_i' + E_i$, where $E_i$ is the model error for class i, $E_i = X_i - (1_i * m_i + T_i P_i)$.

Now, let x be a 1×p vector from the same domain space as the rows of X. To determine which class x belongs to, a determination is made as to how x "fits" into each of the g class models. Specifically, for each i=1,2, . . . g, the class mean is subtracted, and the result is projected onto the class. Thus, $t_{x,i} = (x - m_i) * P_i$ with $t_{x,i}$ representing the projection of x on class i after being centered on class i. The residual or error of x on class i is therefore $e_{x,i} = x - t_{x,i} * P_i'$.

Now, let $s_{x,i}^2 = e_{x,i} * e_{x,i}'$. Then, $s_{x,i}$ can be used by itself or adjusted by degrees of freedom to determine which class x is closest to. Nevertheless, x could still be an outlier. In this regard, to evaluate whether or not x is an outlier, confidence limits are calculated for both $s_{x,i}$ and $t_{x,i}$. Let $\lambda_i(k)$ be the kth largest eigenvalue of the covariance matrix for cluster i, $X_i'X_i/(r_i-1)$, i=1,2, . . . g, and k=1,2, . . . p. For ease of exposition in the following equation, the class subscript i is temporarily removed.

Define $$\theta_v = \sum_{k=A+1}^{p} (\lambda(k))^v$$

for v=1,2,3 and let $$h_0 = 1 - \frac{2\vartheta_1 \vartheta_3}{3\vartheta_2^2}.$$

Given a significance level, α, then confidence limits can be calculated for $s_x$, provided all the eigenvalues of the group covariance matrix have been obtained. In this case, let $$q_\alpha = \vartheta_1 \left[ \frac{c_\alpha \sqrt{2\vartheta_2 h_0^2}}{\vartheta_1} + 1 + \frac{\vartheta_2 h_0 (h_0 - 1)}{\vartheta_1^2} \right]^{\frac{1}{h_0}}$$

where $c_\alpha$ is the inverse of the normal cumulative distribution function corresponding to the upper (1−α)*100 percentile. (For example, if α=0.05, then $c_\alpha$=1.6449—so 95% of the area under the standard normal curve is "below" 1.6449.) For class i, let $q_{i,\alpha}$ be the confidence limit for $s_{x,i}$. For $t_{x,i}$, the Hotelling's $T^2$ test which used the F distribution is used.

The Hotelling's $T^2$ statistic for $t_{x,i}$ is $T_{x,i}^2 = t_{x,i}(T_i'T_i/(r_i-1))^{-1}t_{x,i}'$, and the confidence limit is given by:

$$T_{i,\alpha}^2 = \frac{A_i(r_i-1)}{(r_i-A_i)} F_{A_i,r_i-A_i,\alpha} \text{ Then,}$$

$$TS_{x,i} = \sqrt{\frac{s_{x,i}^2}{q_{i,\alpha}} + \frac{T_{x,i}^2}{T_{i,\alpha}^2}}, \text{ for all } i.$$

If $TS_{x,i} > \sqrt{2}$ for all i, then x is an outlier. Otherwise, x is classified in group $i^* = \text{argmin}_j TS_{x,j}$.

Modeling power provides a measure of the importance of each variable in a given class PCA model. Let $v_i = \text{var}(X_i)$, and let MPOW be a g×p matrix where MPOW(i,j) is the modeling power of variable j in class i. Then:

$$MPOW(i,j) = 1 - \sqrt{\frac{(E_i(:,j)'E_i(:,j))}{(r_i-A_i-1)}{v_i(j)}}$$

Thus, if the modeling power of variable j in class i is "high," then the product of the residuals for variable j in class i, $E_i(:,j)'E_i(:,j)$, must be relatively low compared to the sample variance of variable j in class i, $v_i(j)$. In this regard, modeling power generally ranges between zero and one, although it can occasionally be a negative value.

Discriminatory power is a measure of the ability of a variable to distinguish between classes. Let $E_{i,j}$ be the residuals when group i is "projected onto" group j. Specifically, let $T_{i,j} = (X_i - (1_i * m_j)) * P_j$ be the scores when $X_i$, adjusted for the mean of group j, is projected onto the subspace determined by the eigenvectors in $P_j$. Thus, $E_{i,j} = X_i - (1_i * m_j) - T_{i,j} * P_j'$. Assuming that $S_{i,j}(k) = E_{i,j}(:,k)'E_{i,j}(:,k)/r_i$ when i≠j and $S_{i,j}(k) = E_{i,j}(:,k)'E_{i,j}(:,k)/(r_i - A_i - 1)$ when i=j, and defining $DPOW_{i,j}(k)$ as the discriminatory power of variable k to distinguish between groups i and j, then $$DPOW_{i,j}(k) = \frac{S_{i,j}(k) + S_{j,i}(k)}{S_{i,i}(k) + S_{j,j}(k)}$$

It is possible to make SIMCA models where the groups are not centered beforehand. Everything proceeds as usual except the mean $m_i$ is dropped from the calculations above. Thus, for example, $X_i = T_i * P_i' + E_i$, where $P_i$ are the eigenvectors of $X_i'X_i/(r_i-1)$ where $X_i$ is not centered.

OLS refers to "Ordinary Least Squares Regression," which is synonymous with multiple linear regression ("MLR") from multivariate statistics.

Weights or neuron weights are terms used in the present application to denote the estimates of cluster or segment centers. The terms come from the field of artificial neural networks, one such network being described in Section 1.3 of the present application.

Finally, for purposes of the description that follows, the terms calibration, updating and querying refer generally to modeling and/or functional relationships within or between data sets. As in most statistical endeavors, it is desirable to characterize a population (e.g., a data set comprising all the people in the United States) by using only a sample of that population (e.g., a data set comprising about 1% of the people in the United States). Then, to make predictions with respect to the population, a model can be constructed. For example, if there is demographic data and product preference data on a sample of consumers, an attempt is made to establish a link between the demographic data and product preference data: f(demographic values)=preference values estimate, where f is a function. Specifically, in this example, f is the model.

Therefore, the term calibration typically refers to the creation of a model based on an initial population sample.

The term updating typically refers to adapting the model created in calibration based on new information about the population, i.e., new samples from the population.

The term querying typically refers to the use of a given model to make a prediction or estimate.

EXAMPLE

Before proceeding with a detailed review of the mathematical computation underlying the method and system of the present invention, perhaps the present invention is best explained by an example.

First, suppose that ten different carbonated beverages were each tasted by one hundred consumers of carbonated beverages. Each consumer rated each beverage on a nine-point hedonic scale, thus generating a 100×10 data array, Y.

Secondly, each consumer answered twenty demographic and lifestyle questions, thus generating a 100×20 data array, X.

Thirdly, a panel of beverage experts rated each of the ten carbonated beverages based on fifteen different categories or criteria (e.g., as sweetness, degree of carbonation, smell, and color) using a seven-point scale, thus generating a 10×15 data array, Z.

Each of the data matrices (X, Y and Z) is preferably contained in an ASCII or similar computer-readable file which can then be input or entered into a digital computer program for carrying out the computational steps of the method and system of the present invention.

Once so entered, a segmentation or cluster analysis is performed on the Y data matrix, which represents the consumers' answers to twenty demographic and lifestyle questions, in order to determine the number of clusters in the data. In this regard, a predetermined range of clusters So.) (preferably 2–10 clusters) is evaluated, and one or more optimal clusterings is output for further computation. For example, suppose that the cluster analysis determines that there are possible optimal clusterings at 3 or 6 clusters, and recommends the 3-cluster solution. Thus, Cluster 1 contains 40 consumers who generally prefer diet soda. Cluster 2 contains 30 consumers people who prefer regular soda. Cluster 3 contains 30 consumers who strongly dislike simple flavored drinks like tonic water and club soda.

After the desired number of clusters is ascertained, a calibration routine in run on the Y data matrix that divides the latter into 3 clusters, and, based on a preselected confidence level, removes data points that are not representative (so-called outliers). In this example, suppose that eleven data points were determined to be outliers and removed, and the final cluster sizes were 34, 26 and 29 for clusters 1, 2 and 3, respectively. This calibrated data is then used for further analysis.

Now, models are created that relate the X and Y data matrices. In this regard, after some exploratory analysis, it is determined that 18 of the 20 demographic and lifestyle questions, the X-variables, are "significant" for modeling Y. Based on this determination of which of the X-variables are significant, four models are created relating the X and Y data matrices.

Once the models have been created in this manner, the models can be used by an interested user to further examine the data to gain an understanding of the relationship between the X and Y data matrices, in this example, the relationship between consumers' ratings of carbonated beverages and their answers to certain demographic and lifestyle questions. In this regard, although the cluster analysis and modeling functions are carried out "behind-the-scenes," it is contemplated and preferred that a user-friendly interface be employed to allow querying of the models by interested users. For example, an interested user may submit a query through an Internet web browser installed on a personal computer operably connected to a computer network (e.g., the Internet), the model and data associated therewith being stored and maintained on a computer server also operably connected to the computer network.

Upon examination of the data, in this example, it may be determined that Cluster 1 consumers are generally health conscious, and a question that has high modeling power for Cluster 1 is "I occasionally shop at Natural Foods stores." Similarly, it may be determined that Cluster 2 consumers generally have a fast-paced lifestyle, and Cluster 3 consumers are individuals who tend to plan and organize. Such relational information would be clearly valuable to marketers of carbonated beverages.

The interested user can also attempt to identify the questions that tend to separate or distinguish one cluster from another. For example, it may be recognized that answers to the question "I regularly buy food from the hot deli store" has the highest discriminatory power as between Cluster 1 and Cluster 2, whereas answers to "Marital Status" have are of little or no value in distinguishing between Cluster 1 and Cluster 2.

Now, models can also created that relate the X, Y and Z data matrices. In this example, such modeling allows for a prediction of the optimal product profile (i.e., the criteria of an optimal product) for a given consumer. A non-linear response surface calibration routine is performed on the data resulting in a family of many linear models, each representing the X and Z relationship to Y over a small subset of values of X and Z.

Now, once a family of models has been created in this manner, an optimization routine is applied to provide an interested user with the optimal X for a given Z which maximizes Y. In other words, for this example, the interested user can input a consumer profile (X) of interest, and the method and system of the present invention allows for a prediction of the optimal carbonated beverage qualities (Z) for that consumer profile which maximizes preference (Y).

Again, the consumer/carbonated beverage example presented above is but one example of the application of the method and system of the present invention. Various types of data could be analyzed in accordance with the following description without departing from the spirit and scope of the present invention.

For example, the data could be related to manufacturing and production, in which one data matrix (X) represents the characteristics of raw material, a second data matrix (Z) represents the control settings of certain machinery, and a third data matrix (Y) represents the number of non-defective products manufactured from the raw material using the certain machinery, thereby allowing for a prediction of the appropriate control settings to reduce the number of product defects for given raw material characteristics.

For another example, the data could be related to credit risk management, in which one data matrix (X) represents the demographics of previous loan holders, a second data matrix (Z) represents loan characteristics, and a third data matrix (Y) represents the loan non-default rate, thereby allowing for a prediction of whether an individual defined by certain demographics is a good candidate for a specific type of loan.

For yet another example, the data could be related to Internet-based advertising, in which one data matrix (X) represents user demographics, a second data matrix (Z) represents advertised product characteristics and layout, and a third data matrix (Y) represents the percentage of time an advertised link is selected, thereby allowing for a prediction of which advertising links to display for a particular user.

For yet another example, the data analyzed could again be related to Internet-based advertising, the various data matrices including: numerical measures of the outcomes of a web-viewing event; common measures of qualities of a web page viewer; and common measures of the content displayed on a web page.

For yet another example, the data analyzed could be related to e-commerce, the various data matrices including: numerical measures of the outcomes of an e-commerce sales event; common measures of qualities of an e-commerce consumer; and common measures of the qualities of the item or set of items offered to the consumer during the e-commerce sales event.

For yet another example, the data could be related to Customer Relationship Management ("CRM") processes, the various data matrices including: numerical measures of the response by a prospect to a step in the CRM process; common measures of the qualities of the sales prospect; and common numerical measures of the information presented to the sales prospect during the sales step.

For yet another example, the data could be related to surveying, the various data matrices including: numerical measures of a response by a respondent to a survey question with respect to the survey goal, common measures of the qualities of the respondent, and common numerical measures of the elements of the question or series of questions in the survey.

Computational Analysis

Again, the present invention is a method and system for the dynamic analysis of data. In the preferred embodiment described herein, there are three phases of the dynamic data analysis, as generally indicated in FIG. 1. In the first phase, a cluster analysis or clustering sequence is performed on a data matrix Y in order to segment the data into appropriate clusters, as generally indicated by reference numeral 1000. This first phase is comprised of calibration, querying, and updating.

The second phase is a modeling phase. If a second data matrix X is present such that corresponding rows of X and Y each refer to the same underlying object, in the second phase, a relationship can developed between the X and Y data matrices, which allows the method and system of the present invention to predict responses in Y on the basis of inputted X-data, as generally indicated by reference numeral 1005. This second phase is also comprised of calibration, querying, and updating.

The third phase is also a modeling phase. If a third data matrix Z is present in which corresponding columns of Y and row of Z each refer to the same underlying object, a relationship can developed between the X, Y and Z data matrices, which allows the method and system of the present invention to link X with Z through Y, as generally indicated by reference numeral 1010. This third phase is also comprised of calibration, querying, and updating.

In the description of the method and system of the present invention that follows, it is important to recognize that the computational steps are achieved through the use of a digital computer program. In this regard, it is contemplated and preferred that the computational analysis be coded in C++. With benefit of the following description, such coding is readily accomplished by one of ordinary skill in the art. Of course, other programming languages and techniques could also be employed without departing from the spirit and scope of the present invention.

1.0 Phase I—Cluster Analysis on Y

Referring again to FIG. 1, the first phase of the dynamic data analysis in accordance with the method and system of the present invention is a cluster analysis or clustering sequence 1000.

1.1 Filling of Missing Values

If the Y matrix has any missing values, such data needs to be replaced or filled with appropriate estimates before the cluster analysis proceeds. The non-missing values are referred to as known values. Assuming Y is a n×p matrix that is inputted with appropriate missing value indicators, a preferred method of estimating the missing values proceeds as follows.

First, an average of the known values is calculated, $$ave \equiv [\text{maximum(known values)} + \text{minimum(known values)}]/2 \quad (1)$$

Secondly, each of the known column means for all $j=1,2, \ldots p$ is calculated, unless there are no known values in $Y(:,j)$, $$mc(j) \equiv \text{mean[known values of } Y(:,j)] \quad (2)$$

If there are no known values in $Y(:,j)$, $$mc(j) \equiv ave \quad (3)$$

Thirdly, each of the known row means for all $i=1,2, \ldots n$ is calculated, unless there are no known values in $Y(i,:)$, $$mr(i) \equiv \text{mean[known values of } Y(i,:)] \quad (4)$$

If there are no known values in $Y(i,:)$, $$mr(i) \equiv ave \quad (5)$$

After performing the computations of equations (1)–(5) to estimate a missing value at $Y(i,j)$, let i_miss represent the vector of column numbers of $Y(i,:)$ where known values are. Then:

$$i\_avemn \equiv \text{mean}[mc(i\_miss)] \quad (6)$$

$$\text{diff} \equiv i\_avemn - mc(j) \quad (7)$$

And, $$Y(i,j) = mr(i) + \text{diff} \quad (8)$$

Although this method may provide suitable estimates of the missing values, a second method that builds on equations (1)–(8) is preferred to provide a greater level of accuracy. This method is described with reference to the flow chart of FIG. 2.

Figure 2:
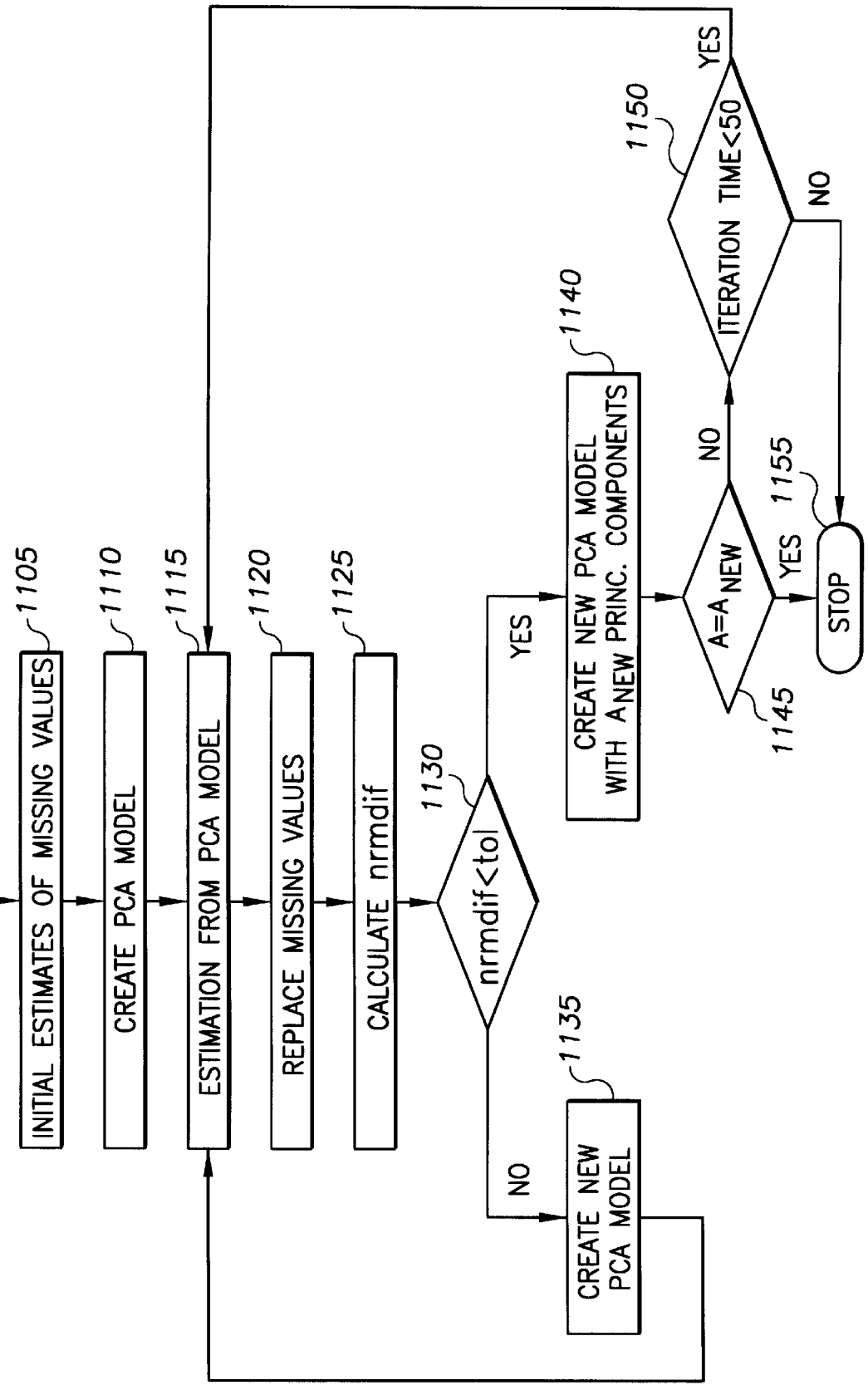
FIG. 2 is a flow chart detailing the process of filling in missing values in a data asset in accordance with the method and system of the present invention.

In this second and preferred method, Y is again an n×p matrix, the data comprising the matrix again being inputted with appropriate missing value indicators, as represented by INPUT 1100 of the flow chart of FIG. 2. Proceeding to BLOCK 1105, initial estimates of the missing values are computed using equations (1)–(8) as described above. This new matrix containing initial estimates of the missing values is referred to as $Y_{fillold}$, and $P_{old}$ is the p×p identity matrix.

A PCA model of $Y_{fillold}$ is created using the validation method described below to determine the "optimal" number, A, of principal components, as indicated by BLOCK 1110 of FIG. 2. In this regard, it is preferred, but not essential, that the PCA model be centered. Let m be the mean of the current $Y_{fillold}$, and let I be a n×1 column of ones.

Then, T and $P_{new}$ are defined as the respective scores and loadings matrices for the PCA model. For a PCA model that is centered, as indicated by BLOCK 1115 of FIG. 2, $Y_{fillold}$ is then estimated by:

$$Y_{est} \equiv TP_{new}' + I*m \quad (9)$$

If the PCA model is not centered, equation (9) generally applies, but $I*m=0$.

Once such an estimate has been calculated, the values of $Y_{est}$ are used to replace the missing values in Y, as indicated by BLOCK 1120 of FIG. 2, resulting in a new matrix referred to as $Y_{fillnew}$.

Then, a measure of similarity between $P_{new}$ and $P_{old}$ normalized by norm($P_{new}$) is calculated, as indicated by BLOCK 1125 of FIG. 2, specifically:

$$nrmdif = [\text{norm}(P_{new}) - \text{norm}(P_{old})]/\text{norm}(P_{new}) \quad (10)$$

where norm(A) is the largest singular value of the matrix A.

Assuming that tol is a very a small number (for example, $tol=10^{-12}$ in this preferred embodiment), a decision is made at DECISION 1130 of FIG. 2 by comparing nrmdif as calculated in equation (10) with tol. If nrmdif>tol, $Y_{fillold}$ is replaced with $Y_{fillnew}$. Similarly, $P_{old}$ is replaced with $P_{new}$. A new PCA model of $Y_{fillnew}$ is created using A principal components, as indicated by BLOCK 1135 of FIG. 2, and the above steps are reiterated until nrmdif<tol.

Once nrmdif<tol, as indicated by BLOCK 1140 of FIG. 2, $Y_{fillold}$ is replaced with $Y_{fillnew}$, and $P_{old}$ is replaced with $P_{new}$. A new PCA model of $Y_{fillnew}$ is created using A principal components, as indicated by BLOCK 1140 of FIG. 2. Assuming that $A_{new}$ represents the optimal number of principal components, a decision is made at DECISION 1145 of FIG. 2. If $A=A_{new}$, the computational steps are concluded, and $Y_{fillold}$ is used as the data matrix Y with filled missing values, an indicated by TERMINAL 1155 of FIG. 2. If not, the process returns to equation (9) for an estimation of $Y_{fillold}$, and the subsequent computational steps are reiterated until $A=A_{new}$ or until a predetermined number of iterations has occurred (for example, 50 iterations in this preferred embodiment), as indicated by DECISION 1150 of FIG. 2. Then, $Y_{fillold}$ is used as the data matrix Y with filled missing values.

As mentioned above, the above computational steps require a determination of $A_{new}$, the optimal number of principal components for the PCA model. In making such a determination, the objective is to determine where a piecewise linear graph "starts to level off." Specifically, let v be a 1×p vector. It is generally assumed that v is "monotonic increasing," i.e., $v(i+1)-v(i) \geq 0$ for $i=1, 2, \ldots p-1$. Then, let $s(i)=v(i+1)-v(i)$, the slope determined by the points $(i, v(i))$ and $(i+1, v(i+1))$. A list, L, is formed using the criterion: if $s(i)<h_1$, then i is added to the list, where the default value for $h_1$ is 0.1. The mean and standard deviation of the list are calculated, and elements lying further than one standard deviation from the mean are deleted.

Then, sublists of consecutive strings of numbers are formed. Specifically, a vector d of consecutive differences is created, $d(i)=L(i+1)-L(i)$ for appropriate i. Suppose that $j_1$ is the smallest index such that $d(j_1)>1$. Thus, $L(1), L(2), \ldots L(j_1)$ must be consecutive. A sublist, $L_1$, of these numbers is formed. Now, suppose that $j_2$ is the next smallest index such that $d(j_2)>1$. Then, $L(j_1+1), L(j_1+2), \ldots, L(j_2)$ are consecutive, and this sublist goes to form $L_2$, and so on.

The minimum of each sublist is taken to be an "optimal number." If there is more than one minimum, then the minima are ranked as follows. If a sublist has one member, this element is given the lowest ranking. The minimum of the minima of all sublists (with more than one member) is given the highest ranking. The highest ranking number is output, and the computation proceeds as follows.

First, for a given n×p data matrix, A, let $m=\min(n,p)$. Now, let lv be the suggested number of principal components. If $m \leq 2$, then $lv=m$, the analysis concludes. If $m>2$, then the first m principal components, scores and eigenvalues of A'A are calculated and denoted by $P_m$, $T_m$ and $d_m$, respectively.

The cumulative explained variance for each principal component is then calculated. Let $v(i)$ be the explained variance for the first i principal components, $i=1, 2, \ldots m$. A piecewise linear graph is made by connecting the sequence of cumulative explained variances using PCA. A determination is made as to when this piecewise linear graph starts to level off, and $lv_1$ is determined, the optimal number of principal components.

Finally, let $lv_2$ be the number of eigenvalues greater than a defined threshold. The default value of this threshold, and the value used in the preferred embodiment described herein, is one. If $lv_1$ is empty and $lv_2=0$, then $lv=m-1$; otherwise, $lv=\max(lv_1, lv_2)$.

1.2 Initial Weight Optimizer

For a given number of clusters, the initial weight optimizer ("IWO") attempts to estimate an optimal partitioning of a data set based on some function of the data (Y) relating to cluster measure. For example, the Calinski-Harabasz (CH) index is given by $$CH = \text{trace}(B)/(g-1)/\text{trace}(L)/(n-g) \quad (11)$$

where g is the number of clusters, and n is the number of data points. The total variation, T, of the data is the sum of the between-cluster variation, B, and the within-cluster variation, L. For a fixed number of clusters, the higher the value of the CH index for a given data clustering, the more optimal the clustering.

In the preferred embodiment of the method and system of the present invention, the IWO routine can be divided into two stages, $IWO_1$ (as depicted in the flow chart of FIG. 3) and $IWO_2$. Each stage can be employed independently of the other. However, the second stage does require an input of an initial set of group means or weights, as will be come clearer in the discussion that follows.

1.2.1 $IWO_1$ (Optimization within the Data Set)

At the outset, samples of g starting points are selected from the data, each such sample being a potential set of cluster center estimates. Samples are selected because it is typically too time-consuming to test all the possible subsets of size g of a data set for optimality. For example, suppose a data set has 100 distinct points, and a 3-cluster solution is sought. In such a data set, there are over 160,000 different subsets of size 3. Therefore, in the present invention, the samples ($W_i^{iwo}$, $i=1,2, \ldots k$) are either randomly or systematically selected. In the systematic selection of the samples, the objective is to generate sample sets that are well dispersed within the data and are representative of the data. This is accomplished through the following steps, as depicted in the flow chart of FIG. 3.

First, PCA is performed on the data set (entered at INPUT 1200) to remove the outliers, those points that have high leverage and are presumed to not be representative of the data. The data set is then transformed to a new set of coordinate axes via the PCA results, and the dimension of the data set is reduced resulting in transformed data set, $T_{data}$, as indicated by BLOCK 1205 of FIG. 3.

Secondly, g widely separated points are selected. The convex hull of a set of points is the smallest convex set containing all of the points. The boundary of the convex hull gives an idea of the shape of a data set. Therefore, a set of points, Bd, of the raw data generally correspond to points along the boundary of the convex hull of $T_{data}$. From this set, a predetermined number of samples of size g are chosen based on the dispersion of the points within a sample relative to each other. Specifically, as indicated by BLOCK 1210 of FIG. 3, a first sample from Bd is that subset of size g such that the sum of the inter-point distances within the sample is the highest of all samples. The second sample is the subset of size g such that the sum of the inter-point distances within the sample is the second highest of all samples, and so on.

In creating the a set of points, Bd, it is preferred that a MATLAB® routine called convhull be used to collect the convex hulls of a number of 2-dimensional subsets of $T_{data}$. (MATLAB® is the brand name of a commercially available software product of The Mathworks, Inc. of Natwick, Mass., USA). Bd is the union of all these sets. The 2-dimensional subsets are all unique combinations of pairs of columns of $T_{data}$. If $T_{data}$ is 1-dimensional, then the minimum and maximum of the set are taken to be Bd. If the number of points in Bd is less than g, then a new set of data points is generated from the full Y rather than $T_{data}$.

Figure 3:
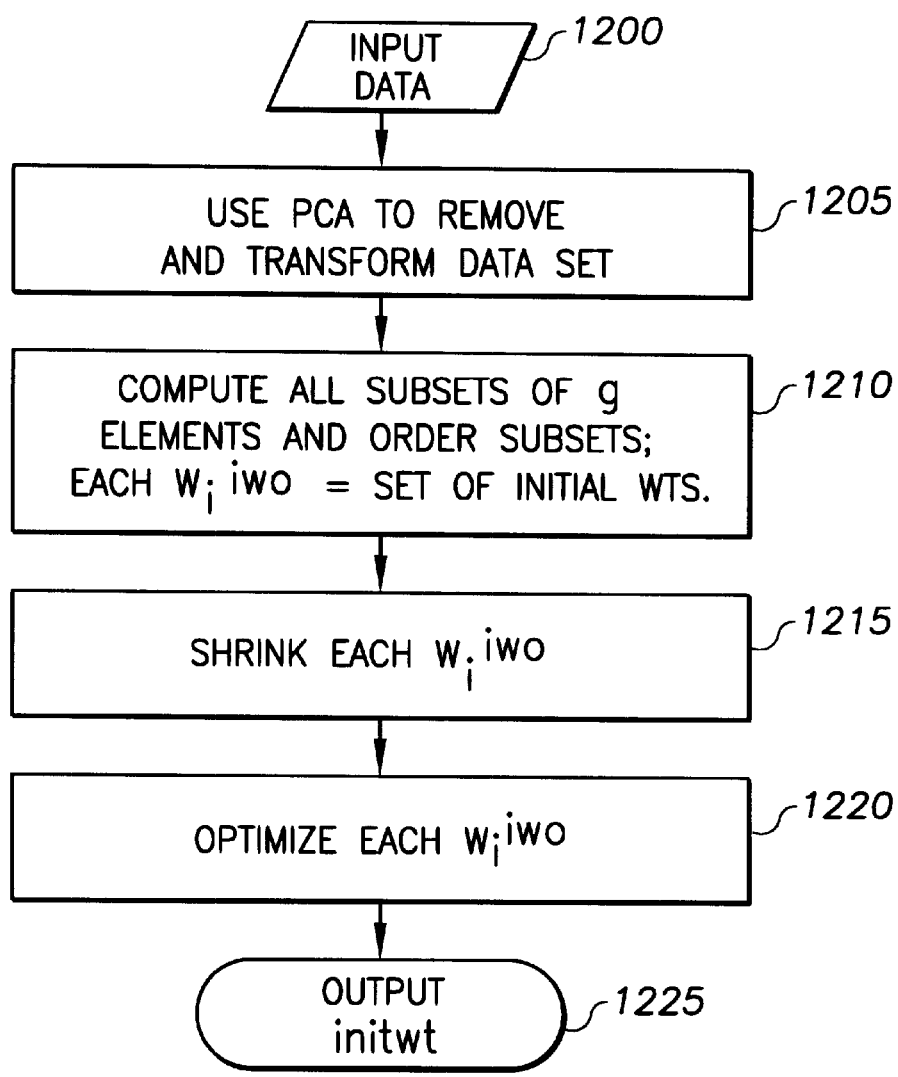
FIG. 3 is a is a flow chart detailing an initial weight optimization process in accordance with the method and system of the present invention.

Then, the selected samples are "shrunk" towards the "center" of the data, as indicated by BLOCK 1215 of FIG. 3. In this regard, a robust estimate of the data center, m, is calculated. For example, m could be the median (which is used in the preferred embodiment) or the trimmed mean. A value for a parameter, γ, is then chosen, and a convex combination of each point of a sample and m is calculated. Symbolically, if w is a point in a sample, then w is transformed according to $w \rightarrow (1-\gamma)w + \gamma m$.

Next, the chosen index of each sample is optimized within the data set by iteratively replacing current values with samples from the raw data, as indicated by BLOCK 1220 of FIG. 3. Specifically, for each sample, g−1 of the points are held fixed, while different points from the data set are substituted for the remaining point. For each substitution, the chosen index is calculated. This substitution/calculation routine is continued until each point in the entire data set has been substituted for the remaining point. The data point providing the best index value is selected to be in the sample while the other point, if different, is removed from the sample. Another of the g sample points is then chosen to vary while the others remain fixed. Again, every data point is substituted for the chosen point, and an index value is calculated. The data point providing the best index value is selected to be in the sample while the other point, if different, is removed from the sample. This process is repeated until there is no improvement in the index, or until an iteration limit is reached. Of course, the entire process is performed with to respect to each sample. For example, if there were ten samples initially, then there will be 10 associated sets of size g each with an assigned index value. In the preferred embodiment described herein, only the sample with the highest CH index is used and the iteration limit is set to one. Finally, the set with the best index, referred to as the initial weight ("initwt"), is used for subsequent computations, as indicated by OUTPUT 1225 of FIG. 3.

1.2.2 IWO$_2$ (Optimization within the Data Space)

After initial starting weights have been selected through the process described above with reference to FIG. 3, or through another similar process, a second optimization stage is employed to further optimize the index by searching various directions of the data space. This second optimization stage can be carried out through one of two preferred subroutines.

In the first subroutine, a process that similar to that of a Kohonen Self-Organizing Map ("SOM") is used, and the data order is fixed by sorting by "density" as with a density trace (which is described in further detail below) and then presented to a "network" one data point at a time. For further explanation of Kohonen Self-Organizing Maps, see T. Kohonen, "Self-organized formation of topologically correct feature maps," 43 *Biol. Cybern.*, pps. 59–69 (1982), an article which is incorporated herein by this reference.

As with a Kohonen network, the sample point (weight) closest to the presented data point "wins" and is chosen to be updated using the same formula as the Kohonen SOM. For every update, the index is calculated. If the index increases, the updated weight remains, and the same data point is again presented to the network. If the index decreases or remains the same, the update is negated, and the next data point from the ordered data list is presented. Each weight, w, has an associated learning parameter, $\alpha_w$. If a neuron weight has not been updated after being presented all or most of the data points in its neighborhood, its learning parameter is reduced according to the formula:

$$\alpha_w^{new} = \alpha_w^{old}/(1+\alpha_w^{old}) \tag{12}$$

This process continues until the index no longer improves for some number of iterations or an iteration limit is reached.

In the second subroutine, which is the preferred or best mode of practicing the method and system of the present invention, the sample weights are moved in the directions of the eigenvectors of the data covariance matrix, rather than updated in the directions of the locations of the presented data points. If the covariance matrix is of full rank, these directions are linear combinations of the eigenvectors of the covariance matrix, i.e., the eigenvectors of the covariance matrix form an orthogonal basis for the data space. A matrix of the (orthonormal) eigenvectors and their opposites is formed. So, if the data space is r-dimensional, and the rank of the covariance matrix is $r_1 \leq r$, then the matrix has $2*r_1$ rows. Thus, rather than presenting a new point to the "network," a new direction (eigenvector) and a magnitude of change in the given direction is presented. The updating procedure then follows that described above with respect to the first routine, except that each direction is presented to each neuron, one at a time. If an update improves the chosen index, the same direction and magnitude are presented again. If not, the same direction is presented to the next neuron until all neurons have seen that direction. Then, the next direction is presented. The magnitude of change of an update, δ, is analogous to α in the first routine. Again, each weight has an associated δ that updates after the weight has not changed upon "seeing" all the directions. Therefore:

$$\delta_{new} = \delta_{old}/(1+\delta_{old}) \tag{13}$$

An initial value for δ is typically the minimum distance between data points unless that distance is zero, in which case δ is set to a value between zero and one. Applicant prefers that δ=0.3. Assuming $w_t$, is a weight at iteration t, v is the presented eigenvector, and $\delta_{wt}$ is the associated magnitude step associated with $w_t$, then $w_{t+1} = w_t + \delta_{wt} v$ if the chosen index improves. $w_{t+1} = w_t$ if the chosen index does not improve.

As with the first subroutine, this process continues until the index no longer improves for some number of iterations or an iteration limit is reached, and the output matrix becomes the initial weight matrix. In the preferred embodiment describe herein, it is preferred that this process terminates if there is no improvement in the CH index over one thousand iterations, or if the total number of iterations reaches ten thousand.

1.3 Cluster Analysis with Self-organizing Maps (SOM's)

At the outset, it is important to recognize that two important aspects of cluster analysis are (1) determining the number of clusters; and (2) recovery, i.e., the ability of the cluster analysis to recover or classify the clusters correctly.

As mentioned above, Kohonen's Self-Organizing Feature Map ("SOFM") or Self-Organizing Map ("SOM") is a type of artificial neural network used in various applications, including cluster analysis and pattern recognition. The present invention employs a variant referred to as an SOM-$_{MHL}$ with enhanced recovery capabilities. Before describing the particular variant, a brief discussion of the basic Kohonen SOM is warranted.

The Kohonen SOM is an iterative system that can be described as follows. Each neuron in a neural network is denoted by an index, which is an element of a set $D \subset Z^k$, the k-dimensional integer lattice. Let s be a metric on the latter space, and assume that $D \subset Z^+$, the set of positive integers. W is the weight matrix for the network, with $W(i,:,t) \in \Re^r$, the weight of neuron i∈D at time t∈$Z^+$, where $\Re^r$ is r-dimensional real space with a metric d. Denote the set of inputs for the neural network by the rows of a n×r matrix Y with $Y(j,:) \in \Re^r$, for j∈{1, 2, . . . n}. Let z be a function of t onto the set of indices {1, 2, . . . , n}, where $z(t)=z_t$. Thus, the winning neuron, or index, is defined as:

$$i_t^* = \min(\operatorname{argmin}_i d(W(i,:,t-1), Y(z_t,:))) \tag{14}$$

Therefore, at time t, the function z selects a row, $z_t$, of Y to be presented or input to the neural network. The distances from $Y(z_t,:)$ to all of the weights [rows of $W(:,:,t-1)$] are calculated according to the metric d. The weight closest to the input $Y(z_t,:)$ "wins" unless more than one weight is equidistant from $Y(z_t,:)$. In that case, since only one weight can win, the closest weight with the smallest index wins. $i_t^*$ is the index associated with the winning weight.

Then, the neighborhood function is defined as $h=h(i, b(t))$ by $h(i, b(t))=1$ if $s(i, i_t^*)<b(t)$; otherwise, the neighborhood function is defined as $h(i, b(t))=0$. $b(t)$ is a positive, typically non-increasing function of time called the range parameter at time t. The weights are then updated according to the following equation:

$$W(i,:,t+1)=W(i,:,t)+h(i, b(t))\alpha(t)(Y(z_t,:)-W(i,:,t)) \quad (15)$$

where $\alpha(t)\epsilon[0,1]$ is referred to as the learning parameter at time t.

Referring again to equation (15), if neuron j is close enough to the winning neuron in the index space D, then $h(i, b(t))=1$ and the associated neuron weight, $W(j,:,t)$, moves closer to the input, $Y(z_t,:)$, by an amount determined by $\alpha(t)(Y(z_t,:)-W(i,:,t))$. The larger the value of $\alpha(t)$, the closer $W(i,:,t)$ moves to $Y(z_t,:)$. In this regard, if $\alpha(t)=1$, then $W(i,:,t)=Y(z_t,:)$.

If neuron j is not close enough to neuron $i_t^*$, then $h(i, b(t))=0$, and its weight does not change, i.e., $W(j,:,t+1)=W(j,:,t)$.

Typically, the metric d is the Euclidean metric, $d_E(x,y)=[(x-y)(x-y)']^{1/2}$. A more general W metric is given by $d_W(x,y,C)=[(x-y)C(x-y)']^{1/2}$, where C is an r×r, positive definite matrix. So $d_E(x,y)=d_W(x,y,C)$ when C=I, the r×r identity matrix.

Another example of $d_W$ is when $C=(Cov(X))^{-1}=(X'X/(n-1))^{-1}$ where X is a data matrix of n data points in $\Re^r$, assuming $(Cov(X))^{-1}$ is positive definite. The latter metric is called the Mahalanobis metric.

At each time t, the set consisting of the rows of Y is partitioned according to the neuron weights. If $nbhd(j, t)$ represents the rows of Y associated with neuron j at time t, then for some $y\epsilon\Re^r$, $$y\epsilon nbhd(j,t) \Leftrightarrow j=\min(argmin_i d(W(i,:,t),y)) \quad (16)$$

These partition elements (nbhd(j, t)) are typically called clusters. When the Euclidean metric is used in the SOM, where the application is cluster analysis, the clusters tend to be hyper-spherically shaped; however, hyper-ellipsoidally shaped clusters are not uncommon. For further explanation of hyper-spherically shaped and hyper-ellipsoidally shaped clusters, see J. Mao and A. K. Jain, "A self-organizing network for Hyperellipsoidal Clustering (HEC)," 7 *IEEE Transactions on Neural Networks*, pps. 16–29 (1996), an article which is incorporated herein by this reference. Furthermore, as described in the Mao-Jain article, by incorporating a "regularized" Mahalanobis metric with the Euclidean metric into the SOM, classification can improve.

Now, let $C_i(t)=(Cov(nbhd(i, t))+\epsilon I)^+$, where typically $0\leq\epsilon<<1$ and where nbhd(i, t) represents both a set and a matrix whose rows are the set elements. Here, $\epsilon$ is added to the diagonal elements of the covariance matrix to insure matrix invertibility. The metric is defined as:

$$d_f(x,y)=(1-\lambda(t))(min_i d_W(x,y,C_i(t)))+\lambda(t)d_E(x,y) \quad (17)$$

where $\lambda(t)\epsilon[0,1]$.

Apparently, this is the metric used in the HEC network in the Mao-Jain article referenced above. In the method and system of the present invention, however, while using the same metric, $d_f$, in equation (16) for a determination of $SOM_{MHL}$, the standard Euclidean metric is used equation (14). In other words, in the method and system of the present invention, $SOM_{MHL}$ takes its input from another unsupervised classifier such as k-means, IWO, or $SOM_E$. In contrast, Mao and Jain describe the use of a double layer network in which the second layer is composed of g principal component subnetworks (PCA subnetworks), where g is the number of neurons.

Indeed, it is not common to link SOM's with other methods as is done in the method and system of the present invention. Rather, a typical SOM implementation can be divided into two phases, ordering and tuning. First, for the ordering phase, initial weights may be chosen randomly or may all be assigned to the center of the data ranges. Parameters $\alpha(t)$ and $b(t)$ are usually "larger," e.g., $0.2\leq\alpha(t)\leq 0.9$, and $b(t)\geq 2$. Both a and b may are commonly non-increasing functions of t. The data set Y may be presented to or input into the network a number of times, e.g., five to more than one hundred times. During the second or tuning phase, $\alpha(t)$ and $b(t)$ are "smaller," e.g., $\alpha(t)=0.02$, and $b(t)=1$. Again, the data set Y is presented to the network a number of times. In this regard, Applicant prefers that the data be presented to the $SOM_{MHL}$ three times.

In the method and system of the present invention, however, $SOM_{MHL}$ and/or $SOM_E$ are just used in the tuning phase, with $IWO_1$, $IWO_2$ or KM (individually or in combination) substituting for the ordering phase. Specifically, in the method and system of the present invention, the clustering sequence proceeds as follows.

Figures 1, 4:
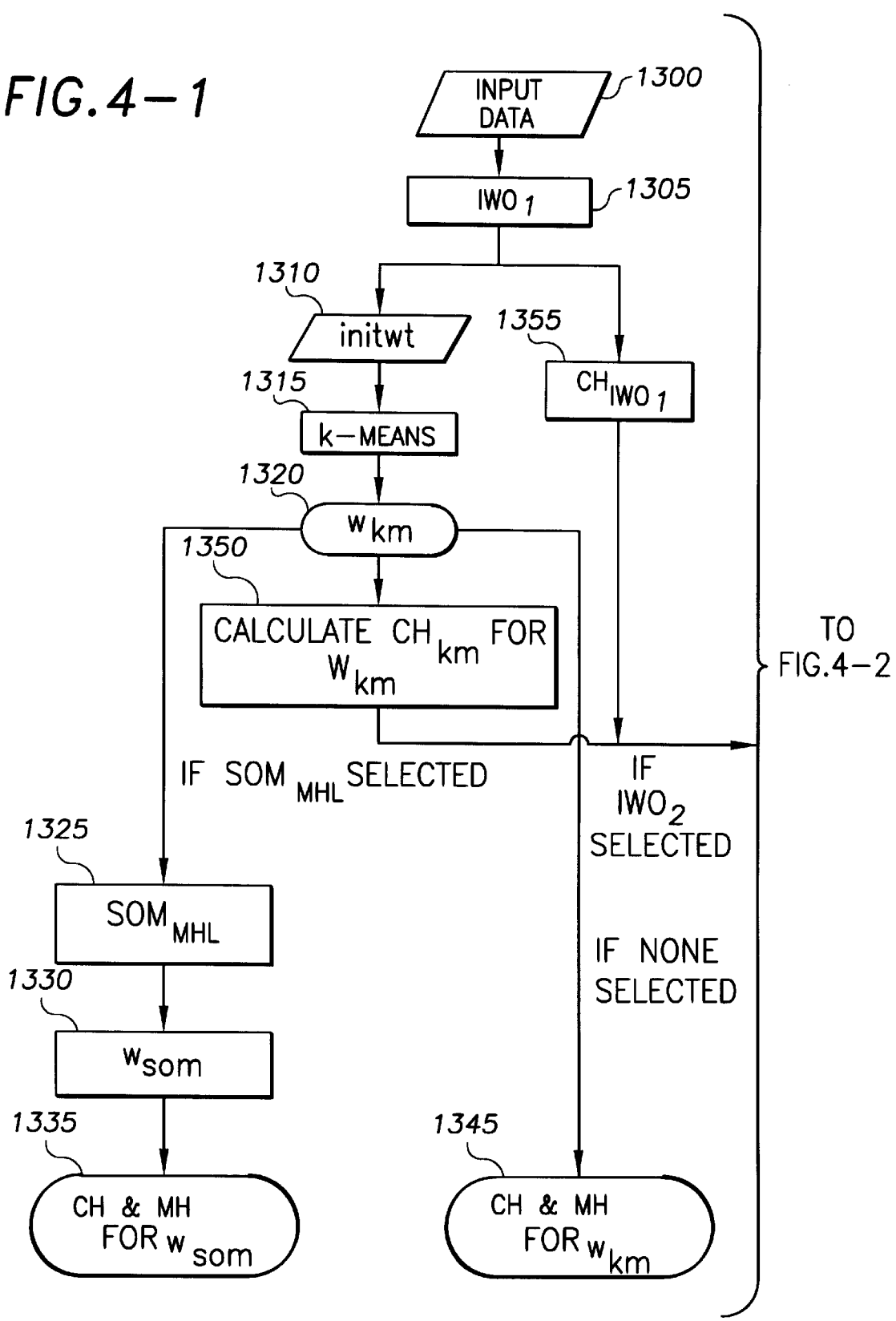
FIG. 4 is a is a flow chart detailing a clustering sequence in accordance with the method and system of the present invention.
Figures 2, 4:
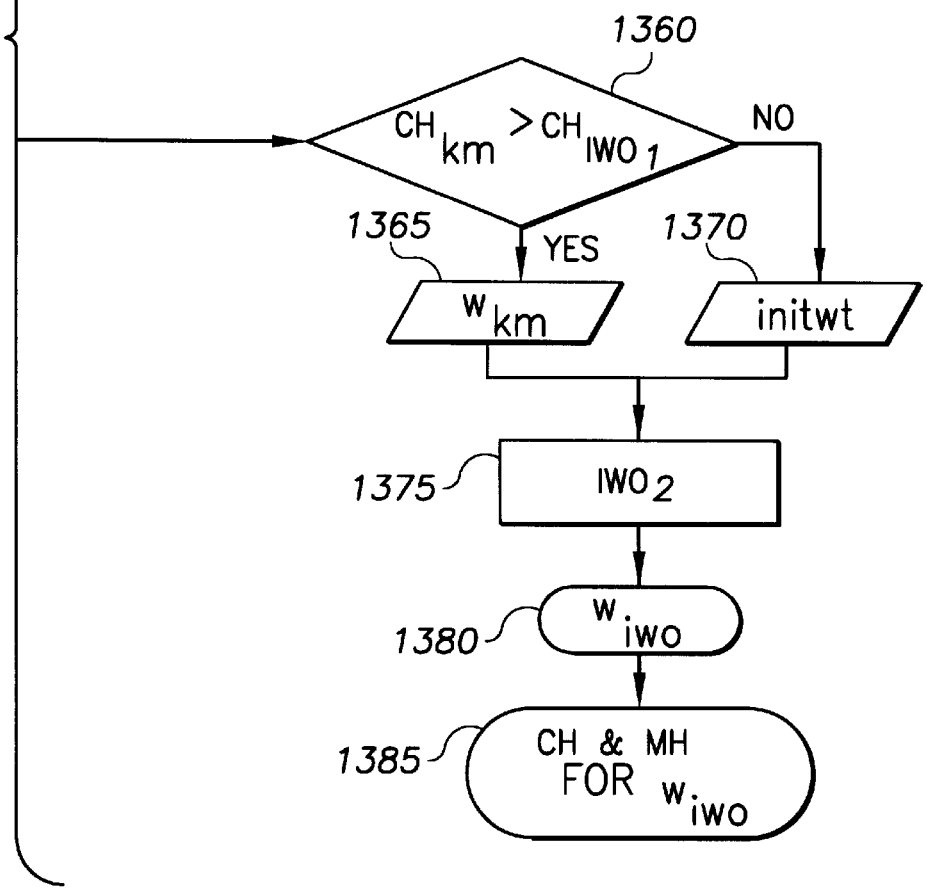

Referring now to FIG. 4, it is assumed the data has already been transformed, if necessary, and ordered, as indicated by BLOCK 1300 of FIG. 4. Then, an initial estimate of initwt is calculated through the steps described with respect to FIG. 3, optimization within the data set, as indicated by BLOCK 1305 of FIG. 4.

Next, initwt is input at INPUT 1310, and the k-means routine is run on the data starting with initwt for the centroid estimates, as indicated by BLOCK 1315 of FIG. 4. The output k-means cluster centroids are denoted by $w_{km}$, as indicated by OUTPUT 1320 of FIG. 4.

Then, the CH indices are calculated for the segmentations determined by (1) initwt, as indicated by BLOCK 1355; and (2) $w_{km}$, as indicated by OUTPUT 1345. The Modified Hubert ("MH") index is also calculated for $w_{km}$, as indicated by BLOCK 1345 and BLOCK 1350; the MH index is further described below in Section 1.5 ("Cluster Number Determination") of the present application.

If $IWO_2$ is selected for the clustering, and if initwt has a greater CH index, as determined at DECISION 1360 and at OUTPUT 1370, initwt is used for the initial cluster averages. The $IWO_2$ clustering is then carried out at BLOCK 1375, and the resulting cluster centroids are referred to as $w_{iwo}$, as indicated by BLOCK 1380.

If $IWO_2$ is selected for the clustering, and if $w_{km}$ has a greater CH index, as determined at DECISION 1360 and at OUTPUT 1365, $w_{km}$ is used for the initial cluster averages. The $IWO_2$ clustering is again carried out at BLOCK 1375, and the resulting cluster centroids are referred to as $w_{iwo}$, as indicated by BLOCK 1380.

If $SOM_{MHL}$ is selected for clustering, $w_{km}$ is used for the starting weights. The $SOM_{MHL}$ clustering is carried out at BLOCK 1325, and the resultant cluster centroids are referred to as $w_{som}$, as indicated by BLOCK 1330.

Finally, the CH and MH indices (if any) for the segmentations determined by $w_{iwo}$ and $w_{som}$, are calculated, as respectively indicated by OUTPUT 1385 and OUTPUT 1335.

1.4 Consistency and Density Trace

In the above-described clustering sequence, no mention was made of the order in which the data is presented to either of the SOM's. In practice, presentation order is often random; however, random presentation can lead to inconsistent results. In other words, the order of data presentation does make a real difference. If the order is fixed, then the results are consistent but possibly sub-optimal, for example, with respect to recovery. Thus, the objective is to find a method by which to order the data so as to achieve consistent and good results. One such method derives from the density trace of a data set. For further explanation and description of a density trace, see J. M. Chambers et. al, *Graphical Methods for Data Analysis* (Boston, Duxbury, 1983), a composition which is incorporated herein by this reference.

A density trace relies on the assignment of a "density" to each data point so that those data points with many nearby neighboring data points have a higher density than those points that are fairly isolated. Specifically, if $y \in \Re^r$ is a data point, $V(r, h)$ is the volume of an r-dimensional hypersphere of radius h, and if n is the total number of data points, then the local density at y is defined as:

$$\text{local density} = \# \text{ of data points in a ball of radius } h \text{ centered at } y/V(r, h)/n \quad (18)$$

Thus, equal weight is given to all the points in the ball around y.

A more general approach weights the data points in the ball around y according to their distance from y. For example, let d be the Euclidean metric, let f(y,h) be the density of the point y with ball radius h, let w be the weighting function, and let $\chi_0(x;h,r)$ be the indicator function for the r-dimensional ball of radius h, centered at the origin, i.e., $\chi_0(x;h,r)=1$, if $d(x, 0) \leq h$ (inside the ball), and $\chi_0(x;h,r)=0$, if $d(x, 0) > h$ (outside the ball). Therefore, $$f(y, h) = \sum_{i=1}^{n} \chi_0(d(Y(i, :), y); 1, r) \cdot w(d(Y(i, :), y)/h)/V(r, h)/n \quad (19)$$

The density trace for a given data set and a given h is the graph of f, or, alternatively, the set f. For example, if $w \equiv 1$, then equation (19) essentially becomes equation (18).

Another common weighting function is $w(s)=1+\cos(2\pi s)$.

Yet another, but perhaps less common, weighting function, is $w(s)=\exp(-s^2/4)$.

In the preferred method and system of the present invention described herein, $w(s)=\exp(s^2/4)$ is used as the weighting function in equation (19), but without division by n to assign a density to each data point for a given h. The data is then preferably sorted from lowest to highest density, although it could also be sorted from highest to lowest density without departing from the spirit and scope of the present invention. Once an order is determined, it is fixed for the presentations to all the stages of the clustering sequence. Thus, if the chosen order is from lowest to highest density, and the data is run through $SOM_{MHL}$ twenty times, then each run has the same ordering from lowest to highest density.

Lastly, in preferred method and system of the present invention as described herein, h is preferably equal to two times the standard deviation of Y.

1.5 Cluster Number Determination

A data set may contain a number of clusters or "distinguishable" subgroups. As such, there are a variety of methods for determining the appropriate cluster number. Of course, each such method may provide a different cluster number for the same data set. For further explanation, see G. W. Milligan and M. C. Cooper, "An examination of procedures for determining the number of clusters in a data set," 50 *Psychometrica*, pps. 159–179 (1985). Furthermore, a given method may indicate that there is more than one optimal grouping or partitioning of a set of data points.

For example, assume Y is an n×p data matrix. A typical method for determining the appropriate cluster number might proceed as follows:

First, the data matrix Y is input successively to a clustering program with neuron or cluster numbers, for example, 2, 3, ... min(n, $n_{max}$), where $n_{max}$ is determined by the user. For each cluster number, a weight matrix and a classification matrix is calculated.

Secondly, the pertinent cluster indices, which are typically functions of the classification matrix and the data, are computed, and whatever associated methods for analyzing them are applied, using the data matrix Y and the classification matrices. From these cluster indices, the optimal number of clusters is estimated.

In the preferred embodiment of the method and system of the present invention, the following cluster indices are used in determining optimal cluster number, each such index being a function of the data matrix and the classification matrix.

The first cluster index is the Modified Hubert ("MH") index, which is further described in R. C. Dubes, "How many clusters are best?—An Experiment," 20 *Pattern Recognition*, pps. 645–663 (1987), an article which is incorporated herein by this reference. The MH index is calculated for each partition of the data matrix Y.

The second cluster index is the Calinski-Harabasz ("CH") index, which is fully described in T. Calinski and J. Harabasz, "A dendrite method for cluster analysis," 3 *Commun. Stat.*, pps. 1–27 (1974), an article which is incorporated herein by this reference. The CH index is first calculated for each partition of the data matrix Y ($\min(n,n_{max})-1$ values). The results are plotted against the number of neurons and displayed for the user. Local maxima indicate possible optimal partitions, with more weight accorded to higher maxima.

In the present invention, it is preferred that the optimal cluster number is determined as follows.

First, Let $\upsilon$ be the list of cluster numbers to be evaluated, i.e., $n_1, n_2, \ldots \min(n,n_{max})$. If only one cluster number is input such that the length of $\upsilon$ is 1, then that cluster number is output as the optimal cluster number.

If, however, the length of $\upsilon$ is greater than 1, then let mhvec be the vector of MH indices for the cluster numbers in $\upsilon$, so that $mhvec(n_i)$ is the MH index for $n_i$ clusters for $i=1, 2, \ldots \text{length}(\upsilon)$. Now, define $mhvec(j)=0$ for $1 \leq j \leq n_1$, and define chvec similarly, replacing the MH index with the CH index. The method described in Section 1.1 ("Filling of Missing Values") is applied with respect to the "leveling off" of piecewise-linear graphs to mhvec, where L represents the list described above in Section 1.1 ("Filling of Missing Values") and c represents the so-called optimal from the method. Let chmx be a list of where the local maxima occur in the graph of chvec, and let chmax be the cluster number where the absolute maximum of the CH index occurs for the elements of $\upsilon$.

Now, let clusnum be the estimated optimal cluster number, which is determined as follows:

(a) If chmx is not empty and chmax≠2, then clusnum=chmax.

(b) If c=1 and L is not empty nor equal to 1, then clusnum=min(L).

(c) If c is empty but chmx is not empty, or if L=1 and chmx is not empty, or if L is empty and chmx is not empty, then clusnum=min(chmx).

(d) In all other cases, clusnum=c.

Figure 5:
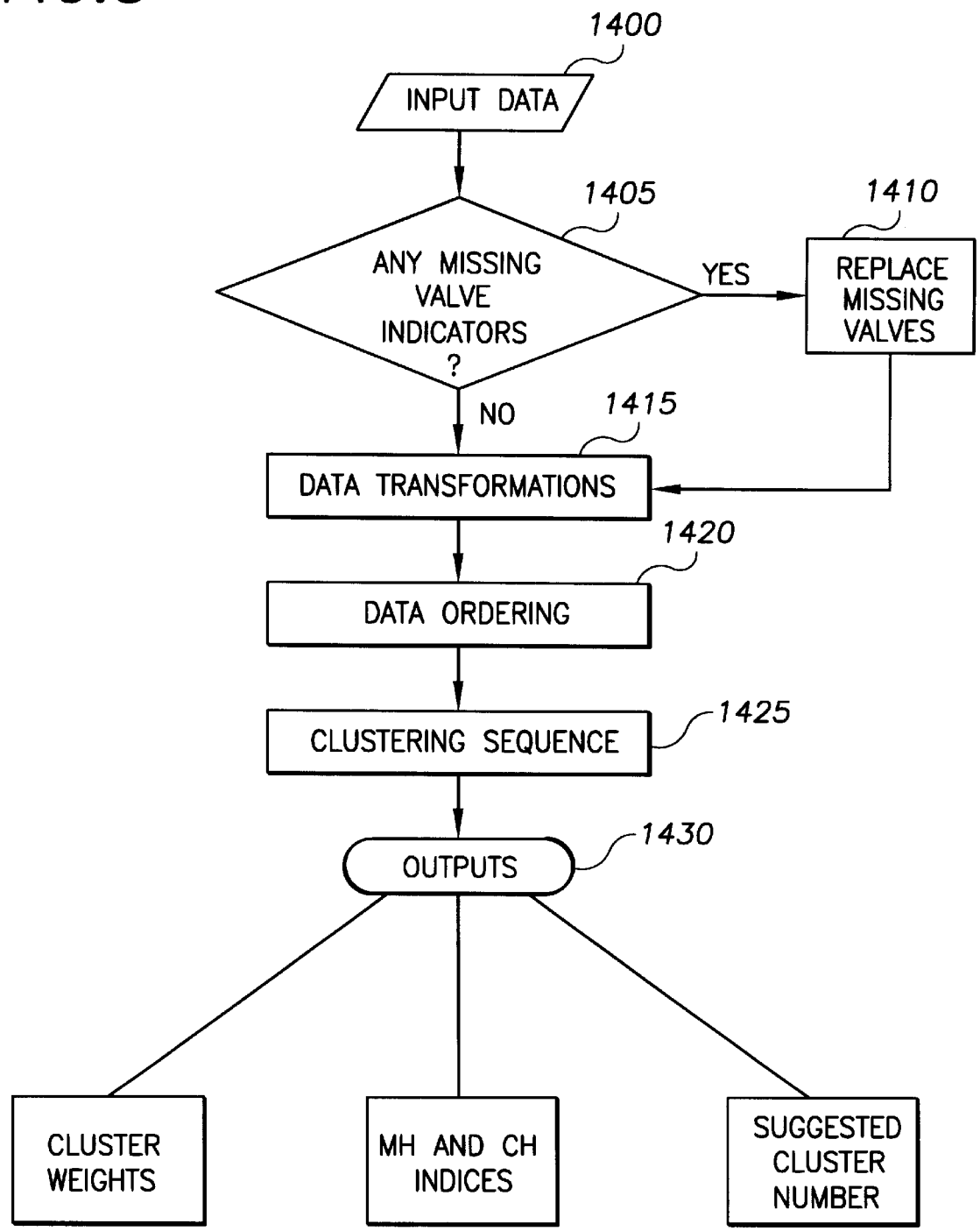
FIG. 5 is a flow chart detailing generation of clusters and an estimation of the optimal cluster number in accordance with the method and system of the present invention.

As shown in FIG. 5, the data matrix Y is entered into the digital computer program used to carry out the computational steps of the method and system of the present invention at INPUT 1400. At the same time, it is also necessary to input: (1) any missing value indicators included in the data matrix Y; (2) whether any data transformations are to be performed on the data matrix Y; (3) the cluster number range that is to be evaluated; (4) the preferred clustering methods to be employed, as described above; and (5) the ball radius number for density calculation, which affects ordering of the data.

Referring still to FIG. 5, once the necessary data and information has been input, a preliminary determination is made as to whether there are any missing value indicators in the data matrix Y at DECISION 1405. If so, these values are replaced or filled with appropriate estimates as described above and indicated by BLOCK 1410. Next, any appropriate data transformations are performed on the data matrix Y, including, for example, row-mean-centering or scaling, as indicated by BLOCK 1415, and the data is appropriately ordered, as indicated by BLOCK 1420.

Once the data has been appropriately transformed and ordered, the determination of the cluster number commences with a range of different cluster numbers being evaluated, i.e. the clustering sequence is run for each cluster number in the cluster number range, as described above and indicated by BLOCK 1425.

Upon completion of the process detailed in FIG. 5, the following outputs are achieved, as indicated at OUTPUT 1430 of FIG. 5: (1) the weights or cluster averages for k-means and each selected method and for each cluster number in the cluster range; (2) the MH and CH indices for k-means and each selected method for each cluster number in the cluster range; and (3) a suggested cluster number for the last chosen method in the following chain of computation: k-means, $IWO_2$, and $SOM_{MHL}$.

1.6 Outlier Determination

As mentioned above, outliers are those data points that have high leverage and are presumed to not be representative of the data as a whole, and thus are deleted from modeling or set aside in some manner. In the method and system of the present invention, at least three criteria are used to determine which data points are outliers. First, if the number of members of a cluster is less than or equal to a preselected cluster size threshold, that entire cluster is removed, and all of its data points are classified as outliers. Secondly, each class that consists solely of one data point or multiple copies of a data point is so denoted as a one-point class; a one-point class is removed if its size is less than or equal to the number of data set columns (or variables). Thirdly, cluster boundaries can be determined using statistical methods; data points outside of these cluster boundaries are also classified as outliers.

One of two methods is used to determine these latter type of outliers, the method used being dependent on the nature of the cluster. First, suppose that there are g clusters in the nxp Y data matrix. Let $Y_i$ be the matrix of Y data rows in cluster i, i=1, 2, . . . g. Then, let $C_j=(Cov(nbhd(j))+\epsilon I)^+$, where typically $0 \leq \epsilon << 1$ and I is the pxp identity matrix. (Applicant prefers that $\epsilon=10^{-7}$). $C_i$ then represents the Moore-Penrose inverse of the regularized covariance matrix of cluster i. Finally, assuming s(i) is the number of elements in cluster i, i=1,2, . . . , g, if s(i)>p and the estimated condition number (as calculated by the MATLAB® routine condest) of $C_j$ is less than one thousand, the first outlier method is preferably employed; otherwise, the second method is employed.

If the first method is employed, then let W be the matrix of cluster averages, where W(i,:) is the average of cluster i. For every element in a given cluster, the weighted distance from the cluster average is calculated and this distance is used to determine whether or not a member of a cluster should be reclassified as an outlier. Specifically, the weighted distance of element j of $Y_i$ from W(i,:) is given by $d_w(W(i,:),Y_i(j,:), C_i)$, for i=1, 2, . . . , g and for j=1,2, . . . , s(i). Now, let $$t(i) = \frac{(s(i)-1)p}{(s(i)-p)} F_{p,s(i)-p}(\alpha) \quad (2)$$

where $F_{p,s(i)-p}(\alpha)$ is the value of the F distribution with p, s(i)-p degrees of freedom at the a significance level. For a given significance level α (1-confidence level) by the user, then $Y_i(j,:)$ is an outlier if $d_w(W(i,:),Y_i(j,:), C_i)>t(i)$.

If the second method is employed, a SIMCA classifier is applied as described above.

1.7 Confidence and Power

In statistics, it is common to make a hypothesis about a population parameter and then test the hypothesis. For example, a hypothesis, $H_0$, might be that the mean of a population is m. The corresponding alternative hypothesis, $H_1$, might be that the mean of the population is not m. Since the population parameters cannot be ascertained directly in many cases, a sample of the population is taken, and inferences about the population are made from that sample. Based on this sample, testing rules are applied to determine when to accept or reject $H_0$. These testing rules involve probability distributions and associated levels of uncertainty.

The level of significance, α, of a test is the probability that $H_0$ is rejected when it should have been accepted. This is commonly called a Type I error. Typical values of α are 0.05 and 0.01.

Associated with α is the confidence level of a test, 1−α or 100*(1−α)%. If α=0.05, then there is a 5% chance of making a Type I error. Alternatively, there would be 95% confidence level that no Type I error will be made.

Different tests applied to a given set of hypotheses, $H_0$ and $H_1$, can lead to different conclusions. In this regard, the power of a test is the probability of accepting $H_0$ when $H_0$ actually holds for that test. This is commonly called a Type II error. If β is the probability of making a Type II error for a test, the power of the test is 1−β or 100(1−β)%.

In the method and system of the present invention, in the classification of segment outliers, a confidence level, 1−α, and a power, β, are bother preselected, with the latter taking precedence. The default and preferred settings are 1−α=0.95 and β=0.2. Using these settings, it is possible that in order for β to be 0.2, α may actually be 0.3, i.e., in order to maintain a power of 80%, the confidence level must drop to 70%.

Now, suppose a nxp data set Y has g clusters, and let M be the matrix of cluster centers, i.e., M(1,:) is the center of group 1, M(2,:) is the center of group 2, and so on. Let $m_0$ be the mean of Y, and let d be a vector of the Euclidean distances of the group means from the data mean, specifically, $d(i)=\sqrt{(M(i,:)-m_0)*(M(i,:)-m_0)^T}$. Then, let $Y_i$ be the matrix of elements of group i for i=1,2, . . . g; let s(i) be the number of members of group i; and let $1_i$ be a column vector of s(i) ones, i=1,2, . . . , g. Define $D_i=Y_i-1_i*M(i,:)$, the set of differences between the elements of group i and M(i,:). Finally, let D be the concatenation of the $D_i$ matrices, $D=[D_1;D_2; \ldots , D_g]$, and let σ be the sample standard deviation of D. The noncentrality parameter, φ, is defined as $$\varphi = \frac{1}{\sigma}\sqrt{\frac{s*d}{g}} \quad (21)$$

For purposes of calibration, as described in Section 1.8 ("Calibration") of the present application, a range, r, of confidence levels and the number, $n_r$ are entered into the digital computer program used to carry out the computational steps of the method and system of the is present invention. Default values are r=[0.15 0.95] and $n_r$=20. A vector c of $n_r$ equally-spaced elements starting at min(r) and ending at max(r) is then created, and a g×$n_r$ matrix F is created with $F(i,j)=p*F_{c(j),p,s(i)-p}/(s(i)-p)$, the inverse of the F cumulative distribution function at a probability of c(j) with p, s(i)-p degrees of freedom.

Now, let $R(x,v_1,v_2,\phi)$ be the probability of being less than or equal to x of the non-central F distribution, with $v_1$, $v_2$ degrees of freedom and noncentrality parameter $\phi$. Define a matrix B such that $B(i,j)=R(F(i,j),p,s(i)-p,\phi)$. Then, for each group i, construct a mapping $f_i$ such that $f_i(c(j))=B(i,j)$.

Finally, to get the actual confidence level, cf(i), of the outlier test for group i, $f_i$ is made continuous over the domain [0,1] and interpolated at β, assuming that the vector B(i,:) is monotonic. If the differences between the elements of B(i,:) and 1 are less than $10^{-5}$, then cf(i) is set to 1. If s(i)≦p, then the F distribution is undefined, and cf(i)=0; otherwise, cf(i) is not a number. In those cases where cf(i) is a number, cf(i) is adjusted to min(cf(i),1−α) where 1−α is the preselected confidence level.

1.8 Calibration

As defined above, calibration refers to the creation of a model based on an initial sample. In the following description, the model is a classifier in that, if an appropriate data point is input, the model or function output is a class number.

Let Y be a real data matrix with dimensions n×p. The rows of this matrix are called points or objects, and $\mathcal{D}_y$ is the set of possible row vectors for Y. As shown in FIG. 6, the data matrix Y is entered into the digital computer program used to carry out the computational steps its of the method and system of the present invention at INPUT 1500. At the same time, similar to the process described above with reference to FIG. 5, it is also necessary to input: (1) any missing value indicators included in the data matrix Y; (2) whether any data transformations are to be performed on the data matrix Y; (3) the number of clusters; (4) the preferred clustering methods to be employed, as described above; and (5) the ball radius number for density calculation, which affects ordering of the data. Additionally, it is further necessary to input (6) the cluster size threshold, such that if the size of any cluster is less than or equal to this number, that cluster is deleted with its members being classed as outliers; (7) the number of principal components for a PCA model for a potential PCA plot of the data and cluster averages with the cluster membership shown; and (8) parameters affecting the confidence level of the outlier tests, including for example, (a) desired confidence level, (b) power of outlier test parameter, β, where 1−β, is the power of the test, (c) interpolation range of the confidence level, and (d) number of interpolation points for confidence level.

Referring still to FIG. 6, once the necessary data and information has been input, a preliminary determination is made as to whether there are any missing value indicators in the data matrix Y at DECISION 1505. If so, these values are replaced or filled with appropriate estimates as described above and indicated by BLOCK 1510. Next, any appropriate data transformations are performed on the data matrix Y, including, for example, row-mean-centering or scaling, as indicated by BLOCK 1515, and the data is appropriately ordered, as indicated by BLOCK 1520.

Once the data has been appropriately transformed and ordered, the data is clustered according to the input cluster number, as described above and indicated by BLOCK 1525. Then, any small clusters are removed from the data set, as indicated by BLOCK 1530; at the same time, any one-point classes are removed if their respective size is less than or equal to the number of data set columns, p. An outlier analysis is run on the remaining clusters, as indicated by BLOCK 1535 of FIG. 6.

Specifically, with respect to the outlier analysis, the cluster sizes are calculated. If any cluster sizes are less than or equal to the cluster size threshold, they become outliers. The outlier analysis continues with respect to the remaining clusters, and those outliers are removed. If any of the subsequent clusters sizes fall below the cluster size threshold, they are removed. Weights or cluster averages corresponding to the deleted clusters are also removed. Then, once it is determined which clusters are to remain, the original members of those clusters are used to determine cluster boundary-type outliers according to the methods described in detail below in Section 1.9 ("Classification of New Y-Data") of the present application.

After the outlier analysis is completed, if any of the clusters are empty, the corresponding row of the classification matrix and the weight matrix are removed, as indicated by BLOCK 1540. $Y_{in}$ then represents the remaining data, i.e., the data with the outliers removed.

A PCA is then run on $Y_{in}$ with the specified number of principal components, as indicated by BLOCK 1545. This latter PCA model will only by used for potential display purposes. In addition, using the PCA validation method described in Section 1.1 ("Filling of Missing Values"), a PCA model of $Y_{in}$ is made, and the variance of the model residuals is calculated. This is taken to be an estimation of noise variance of $Y_{in}$, as indicated by BLOCK 1550. Next, the mean and covariance matrix of $Y_{in}$ are calculated, as indicated by BLOCK 1555. The density trace of the cluster averages and the data are calculated, as indicated by BLOCK 1560, and the final cluster sizes are calculated, as indicated by BLOCK 1565.

Then, variance-covariance matrices are calculated for each cluster, as indicated by BLOCK 1570, and a raw version of the weights or cluster averages is calculated, as indicated by BLOCK 1575.

Finally, a projection of $Y_{in}$, the weights or cluster averages and the outliers on the PCA space is made, as indicated by BLOCK 1580. These are concatenated into one matrix with, except for the weights or cluster averages, the corresponding row number from Y, identification number and class number. Outliers are given a class number of zero, and the weights are given a class number of one hundred. The row and identification numbers for the weights are zeros. This matrix is referred to as "outputmat" in the computational steps that follow.

As indicated by OUTPUT 1585 of FIG. 6, various other data and information is also preferably output in accordance with the method and system of the present invention, as detailed in Table A below:

TABLE A

OUTPUTS (a) cluster averages.
(b) neural network weights, provided that $SOM_{MHL}$ is selected for the initial weight optimizer.
(c) outlier information, including:
    (i) row indices and identification numbers of outliers;
    (ii) outliers in raw data form;
    (iii) row indices and identification numbers of the inliers;
    (iv) confidence thresholds for each cluster and parameters indicating which type of outlier analysis corresponds to which cluster;
    (v) a measure of total within cluster variances, as described in Section 1.7 of the present application; and
    (vi) actual confidence levels for each cluster, as described in Section 1.7 of the present application.
(d) regularized inverse covariance matrices for each cluster.
(e) standard deviation of the data concatenated with either the group averages or the neuron weights.
(f) minimum of the densities of either the group averages or the neuron weights.
(g) principal components of the data.
(h) mean and covariance matrix of the transformed data.
(i) data set with estimated missing values, if any, and the location of the missing values.
(j) cluster sizes.
(k) variance-covariance type matrices for each cluster.

1.9 Classification of New Y Data

Once the cluster model is developed, it can be used to classify new Y-type data, y ($y \in \mathcal{D}_y$). In this regard, two methods of outlier analysis are used to determine class membership, the method used with respect to a particular cluster being dependent on the nature of the cluster. For example, let nbhd(j) be the matrix of the Y-rows in cluster j after calibration. Then, let $C_j = (Cov(nbhd(j)) + \epsilon I)^+$, where typically $0 \leq \epsilon << 1$. (Applicant prefers that $\epsilon = 10^{-7}$). Finally, let W be the matrix of cluster averages, where W(j,:) is the average of cluster j; and let s(j) be the number of elements in cluster j. If s(i)>p and the estimated condition number of $C_j$ is greater than one thousand, the first method of determining class membership is preferably employed; otherwise, the second method is employed.

If the first method is employed, j*, the initial classification of y based on the minimal weighted distance of y from the cluster averages, is calculated:

$$j^* \min(argmin_j d_W(W(j,:), y, C_j)) \quad (22)$$

Then, let $d_{j^*} = d_W(W(j^*,:), y, C_j^*)$, and $$t(j) = \frac{(s(j) - 1)p}{(s(j) - p)} F_{p, s(j) - p(\alpha)} \quad (23)$$

where $F_{p, s(j) - p}(\alpha)$ is the value of the F-distribution with p, s(j)–p degrees of freedom at the α significance level. For a given significance level α (1-confidence level), y is in class j* if $d_{j^*} \leq t(j^*)$; otherwise, y is an outlier.

If the second method is employed, a SIMCA classifier is applied as described above.

1.10 New Cluster Formation From Outliers

As clusters are updated in a data set, as is further described below, outliers may form new clusters. As mentioned above, one of the preferred outputs of the cluster calibration process is the minimum density of cluster weights. In the preferred embodiment described herein, this density is calculated using the weighting function, $w(s) = 1 + cos(2\pi s)$, in equation (19), a number that is denoted by $min_{den}$ in subsequent computational steps.

Figures 2, 7:
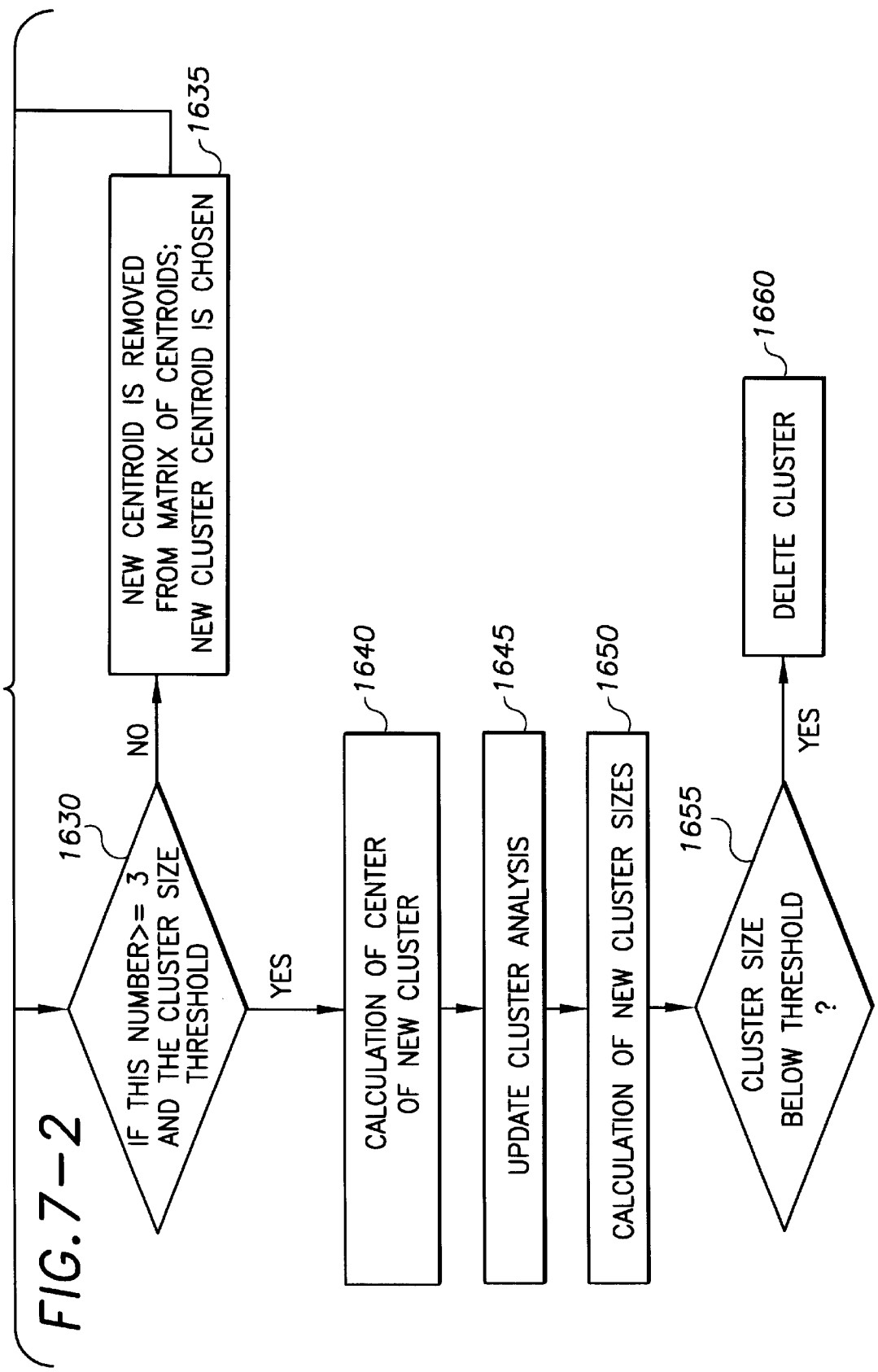
FIG. 7 is a flow chart detailing a search for new cluster formations in a data set in accordance with the method and system of the present invention.

Referring to FIG. 7, and assuming that O is a matrix of the current outliers and that $W_y$ is the current cluster centroids, the method and system of the present invention first calculates the density trace of all current outliers, O, and sorts them according to magnitude, as indicated by BLOCK 1600. Now, let those outliers with a density greater than or equal to $min_{den}$ (if any) be represented by $O_1$, where $O_1(1,:)$ has the highest density, $O_1(2,:)$ has the second highest density, and so on, as indicated by BLOCK 1605. At DECISION 1610, a determination is made as to whether $O_1$ is empty; is so, the process terminates, as indicated at TERMINAL 1615.

However, if $O_1$ is not empty, the outlier with the highest density above $min_{den}$, $O_1(1,:)$, is chosen to become a new cluster centroid and is concatenated with other current cluster centroids, as indicated by BLOCK 1620. The Euclidean distances of all outliers to all the cluster centroids are then calculated, and the number closest to the new centroid, $O_0(1,:)$, is recorded, as indicated by BLOCK 1625. If this number is greater than or equal to the minimum of three (3) and the cluster size threshold, as determined at DECISION 1630, then the process proceeds to BLOCK 1640, as more fully described below. Otherwise, the process proceeds to BLOCK 1635, and the new centroid is deleted from the matrix of cluster centroids and $O_1$. The process returns to BLOCK 1605, $O_1(2,:)$ is chosen for the new cluster centroid, and the process continues until $O_1$ is empty and the process terminates at TERMINAL 1615.

Returning to the DECISION 1630, if the number closest to the new centroid, $O_1(1,:)$ is greater than or equal to the minimum of three (3) and the cluster size threshold, then the process proceeds to BLOCK 1640 where the center of the new cluster, along with the associated outlier parameters, is calculated. The augmented matrix of cluster centers is represented by $Waug_y$.

The classification routine, as described above in Section 1.9 ("Classification of New Y Data") is then updated with the new cluster information, and all of the current outliers, O, are run through it. This creates a set of inliers, $In_O$, of the set O, as well as outliers, $Out_O$, of the set O. $Out_O$ now becomes the current set of outliers. So O is set equal to $Out_O$ and the process starts again. This process continues until no new clusters are formed, as indicated by BLOCK 1645.

Finally, as indicated by BLOCK 1650 of FIG. 7, the new cluster sizes are calculated. If any new cluster has a size below the cluster size threshold, as determined at DECISION 1655, then that cluster and its corresponding parameters are deleted, and its elements once again become outliers, as indicated by BLOCK 166. For example, the corresponding row of $Waug_y$ is removed.

1.11 Updating Means and Other Quantities; Forgetting Factor.

Part of the updating phase is changing cluster means and other quantities when new data is added and classified as belonging to any of various clusters. Let $W_y$ be the matrix of cluster averages from the calibration process. If $Y_i$ represents the elements of Y in cluster i, and $gsz(i)$ is the number of members in $Y_i$, then $W_y(i, :) = \text{sum}(Y_i)/gsz(i)$.

Now, let the $n_i \times p$ matrix $Y_{i,new}$ represent new members of cluster i during an update. Thus, the new cluster average for cluster i is updated according to:

$$W_y(i, :) \to \frac{gsz(i) * W_y(i, :) + sum(Y_{i,new})}{gsz(i) + n_i} \quad (24)$$

Similarly, $$gsz(i) \to gsz(i) + n_i \quad (25)$$

The "sums of squares" matrices for each cluster are also stored during calibration for use in updating. For cluster i, this matrix is $YY_i \equiv Y_i'Y_i$. $YY_i$ is updated by adding the sums of squares of the new data, i.e., $YY_i \to \lambda * YY_i + Y_{i,new}'Y_{i,new}$, where $\lambda$ is referred to as the forgetting factor. The forgetting factor has a value between zero and one, and has the effect of downweighting or "forgetting" some of the old data. If $\lambda=1$, then there is no "forgetting."

The cluster covariance matrix for cluster i, $Cv_i$, can be updated according to:

$$Cv_i \to \frac{\frac{YY_i}{gsz(i)+n_i} - W_y(i, :)'W_y(i, :)}{\frac{gsz(i)+n_i-1}{gsz(i)+n_i}} \quad (26)$$

where $YY_i$ is the current or updated version of $YY_i$, and $gsz(i)$ is not yet updated. $Cv_i$ is an intermediate result not stored for future updates. Its use is in calculating the new cluster regularized inverse covariance matrix for cluster i, $C_i$. The updated version of $C_i$ is $C_i=(Cv_i+\epsilon I)^-$ where $\epsilon$ is equal to $10^{-7}$ in the preferred embodiment described herein, and I is the $p \times p$ identity matrix.

1.12 Updating

Figure 8:
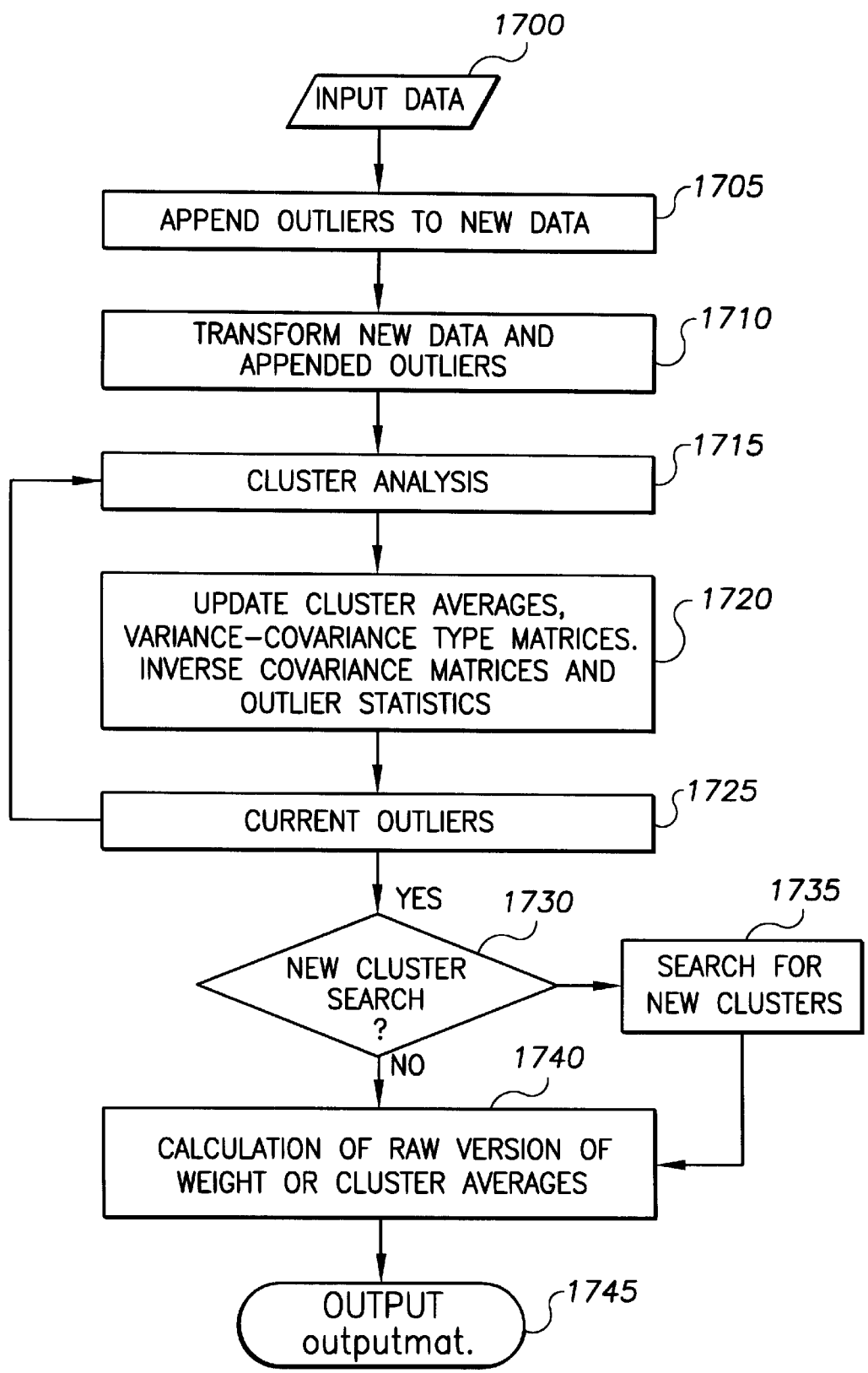
FIG. 8 is a flow chart detailing the updating of a cluster model in accordance with the method and system of the present invention.

Referring now to FIG. 8, once the cluster model has been appropriately calibrated, it can be updated with new data. For example, let $Y_{new}$ be a matrix of new inputs where each row is in $D_y$.

First, as indicated by INPUT 1700 of FIG. 8, various inputs are required, including those inputs described in Section 1.8 ("Calibration") of the present application with reference to BLOCK 1500 of FIG. 6, along with (1) the new data, $Y_{new}$; (2) identification numbers for the new data; (3) a "search-for-new-clusters indicator," which controls whether new clusters are searched for among the outliers; (4) forgetting factor; and (5) parameters affecting the confidence level of the outlier tests, including (a) the power of outlier test parameter, $\beta$, where $1-\beta$, is the power of the test, (b) the interpolation range of the confidence level, and (c) the number of interpolation points for the confidence level.

Next, the outliers from the calibration process or the most recent update are appended to the new data, as indicated by BLOCK 1705. Such outliers can thus be classified as "in," as cluster averages and boundaries change with updating. This new augmented matrix is referred to as $Y_{new+}$ in the subsequent computational steps.

The new data and appended outliers are then transformed according to the calibration inputs, for example, row-mean-centering or scaling, as indicated by BLOCK 1710, and this new matrix is referred to $Yt_{new+}$.

A classification program is initiated, as indicated by BLOCK 1715, in which all rows of $Yt_{new+}$ are classified into existing classes. The outlier routine is applied to these new members, and the new outliers are separated out as current outliers.

Then, the cluster averages, variance-covariance type matrices, inverse covariance matrices and outlier statistics are updated according to the new data and its classification, as indicated by BLOCK 1720. After such updating has been completed, the current outliers, represented by BLOCK 1725, are classified as described above with reference to BLOCK 1715. The cluster averages, variance-covariance type matrices, inverse covariance matrices and outlier statistics are again updated, if necessary, as indicated by BLOCK 1720.

If the appropriate "search-for-new-clusters indicator" was included in the input at INPUT 1700, as determined at DECISION 1730, the new cluster search routine is then initiated, as indicated by BLOCK 1735 of FIG. 8 and described in detail in Section 1.10 ("New Cluster Formation from Outliers") of the present application.

Next, a raw version of the weights or cluster averages is calculated, as indicated by BLOCK 1740. Finally, a projection of $Y_{new+}$, the weights or cluster averages and the outliers on the PCA space is made, as described in Section 1.8 ("Calibration") of the present application, resulting in a matrix referred to as outputmat, as indicated by OUTPUT 1745.

1.13 Querying

After calibration and/or updating has been completed, the classifier model described in Section 1.9 ("Classification of New Y Data") of the present application can be used to predict the class (if any) of the new Y-data.

Figure 9:
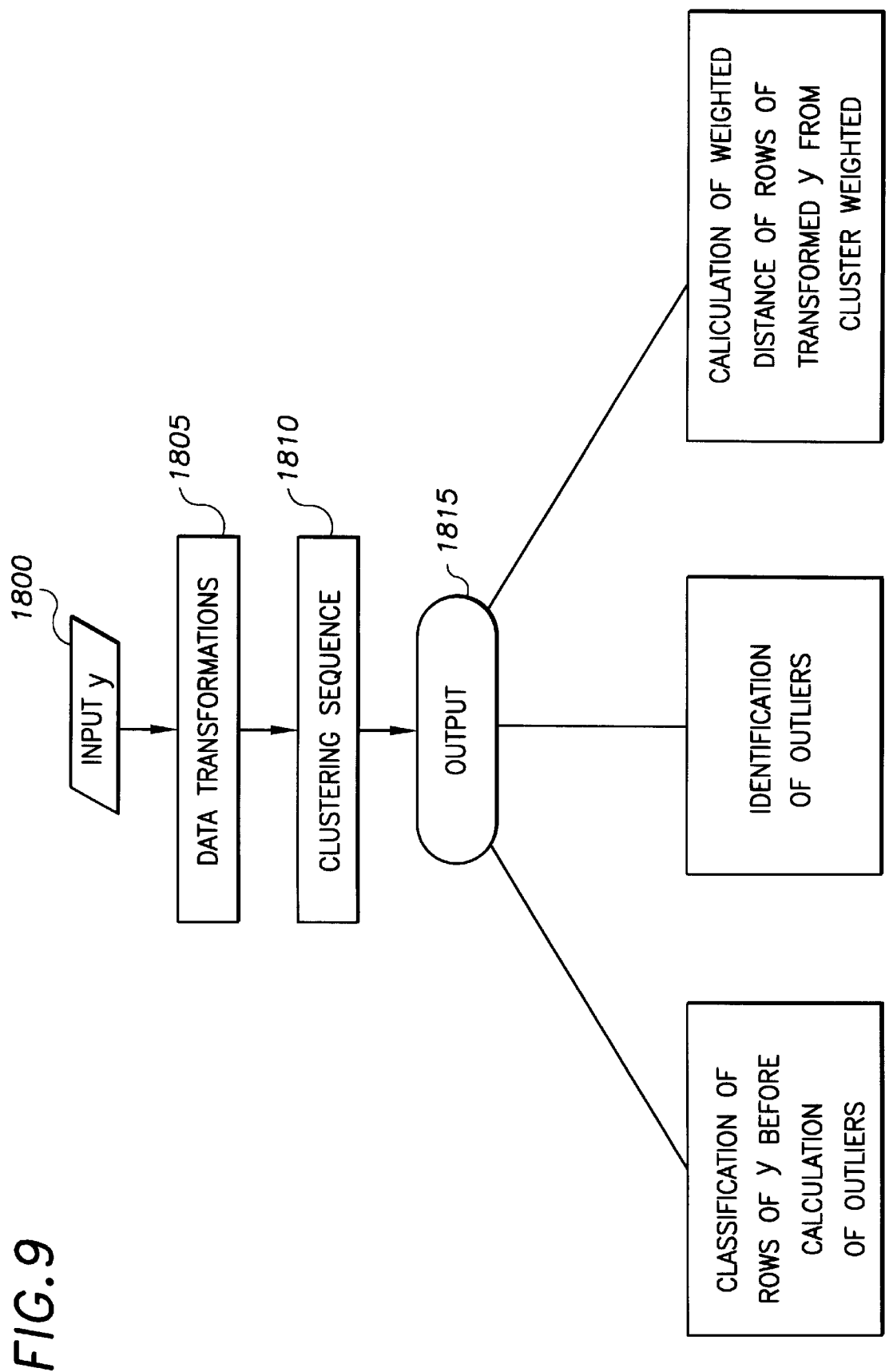
FIG. 9 is a flow chart detailing the querying of a cluster model in accordance with the method and system of the present invention.

First, as indicated by INPUT 1800 of FIG. 9, a vector or matrix, y, that is to be classified is entered. This vector or matrix, y, is then transformed according to the inputs of the calibration described above in Section 1.8 ("Calibration") of the present application, as indicated by BLOCK 1805. The transformed y vector or matrix is then run through the classification program described above in Section 1.12 ("Updating") of the present application, as indicated by BLOCK 1810.

As a result of such querying, the following outputs are achieved, as indicated at OUTPUT 1815 of FIG. 9: (1) the classification of all rows of y before outliers were calculated; (2) the identification of the rows of y which are outliers; and (3) weighted distances, depending on the metric used, of the rows of the transformed y from the cluster weights.

In summary, the rows of the original Y data matrix are first classified as belonging to a certain group, or are classified as outliers. Such clustering is arrived out through preselected inputs or by evaluating a number of different clusterings using one or more clustering methods. In the carbonated beverages example set forth at the outset of this application, three (3) clusters were identified, and eleven of the consumers were classified as outliers. After such clustering, a model can be created to predict the class (if any) of new Y-type data. Finally, the model can be updated with the incorporation of new Y-type data, and new clusters may be identified as a result of such updating.

2.0 Phase II—X→Y Modeling

Referring again to FIG. 1, if a second data matrix Y is present such that corresponding rows of X and Y each refer to the same underlying object, in the second phase, a relationship can developed between the X and Y data matrices, which allows the method and system of the present invention to predict responses in Y on the basis of inputted X-data, as generally indicated by reference numeral 1005.

First, let X and Y be real data matrices with dimensions n×q and n×p, respectively. The rows of these matrices are called points or objects. Then, let $\mathcal{D}_x$ be the set of possible row vectors for X. As described in Section 1.8 ("Calibration") of the present application, $\mathcal{D}_y$ is the set of possible row vectors for Y.

After the calibration described above, the rows of Y are first classed as outliers, and those rows that are not outliers are referred to as inliers. The inliers are then further grouped in the classification matrix, G. Assuming in represents the row numbers of Y that are inliers, $X_{in}=X(in,:)$ and $Y_{in}=Y(in,:)$, in the preferred embodiment described herein, four models are then created relating $X_{in}$ and/or G to $Y_{in}$, as is described in further detail below.

2.1 Alternate Discriminatory Power

For a given clustering of data, it is often useful to understand how each of the data variables "discriminate" between the classes. This variable descriptor is called discriminatory power, and a measure of it can be calculated as part of the SIMCA classification algorithm. However, in the method and system of the present invention, an alternate approach is contemplated, which is referred to as alternate discriminatory power.

Specifically, X and Y are be data matrices with dimensions n×q and n×p, and a clustering analysis has been performed on Y. Assuming that G is the classification of $Y_{in}$, this classification is imposed on $X_{in}$. Now, to find the discriminatory power of the various X-variables, assume that the X-data are integers with finite scale ranges. The X-variables are represented by the columns of X.

Consider variable j (column j), and let $m_j$ and $M_j$ be the respective, allowable minimum and maximum of the variable j. Then, the variable j can only take on the values $m_j$, $m_j+1$, $m_j+2$, ... $M_j-1$, $M_j$. Let $n_i$ be the size of class i; let $X_i$ be the rows of X in group or cluster i, i=1, 2, ... g; and let $C(i,k,j)=$(# elements of $X_i(:,j)$ equal to k). For example, this could represent the number of people in group i who had answered k to question j. The frequencies with which variable j takes on values is defined by:

$$\text{freq}(j=k|i)=C(i,k,j)/n_i \qquad (27)$$

where k=$m_j$, $m_j+1$, $m_j+2$, ... $M_j-1$, $M_j$.

Now, $D_j(i_1,i_2)$ is the so-called discriminatory power of variable j to distinguish between classes $i_1$ and $i_2$:

$$D_j(i_1, i_2) = \sum_{k=mj}^{Mj} \text{abs}(freq(j=k|i_1) - freq(j=k|i_2)) \qquad (28)$$

If the variable j is continuous, rather than discrete, then the number of "bins" or categories, C, must be provided. For example, assuming $\delta=(M_j-m_j)/C$, then:

$$\text{freq}(j=k|i)=(\text{\# elements of } X_{in}(in,j) \text{ in the interval } [m_j+(k-1)\delta, m_j+k\delta))/n_1 \qquad (29)$$

where k=1,2, ... C.

$D_j(i_1,i_2)$ would then be defined as in equation (29). Nevertheless, it is important to note that $D_j(i_1,i_2)$ has little meaning in and of itself, but is useful in a relative sense for ranking. Furthermore, during updating, C(i,k,j) and $n_i$ are adjusted for the new data so as to give cumulative results; therefore, freq(j=k|i) and $D_j$ can be updated.

2.2 Calibration

Figure 10:
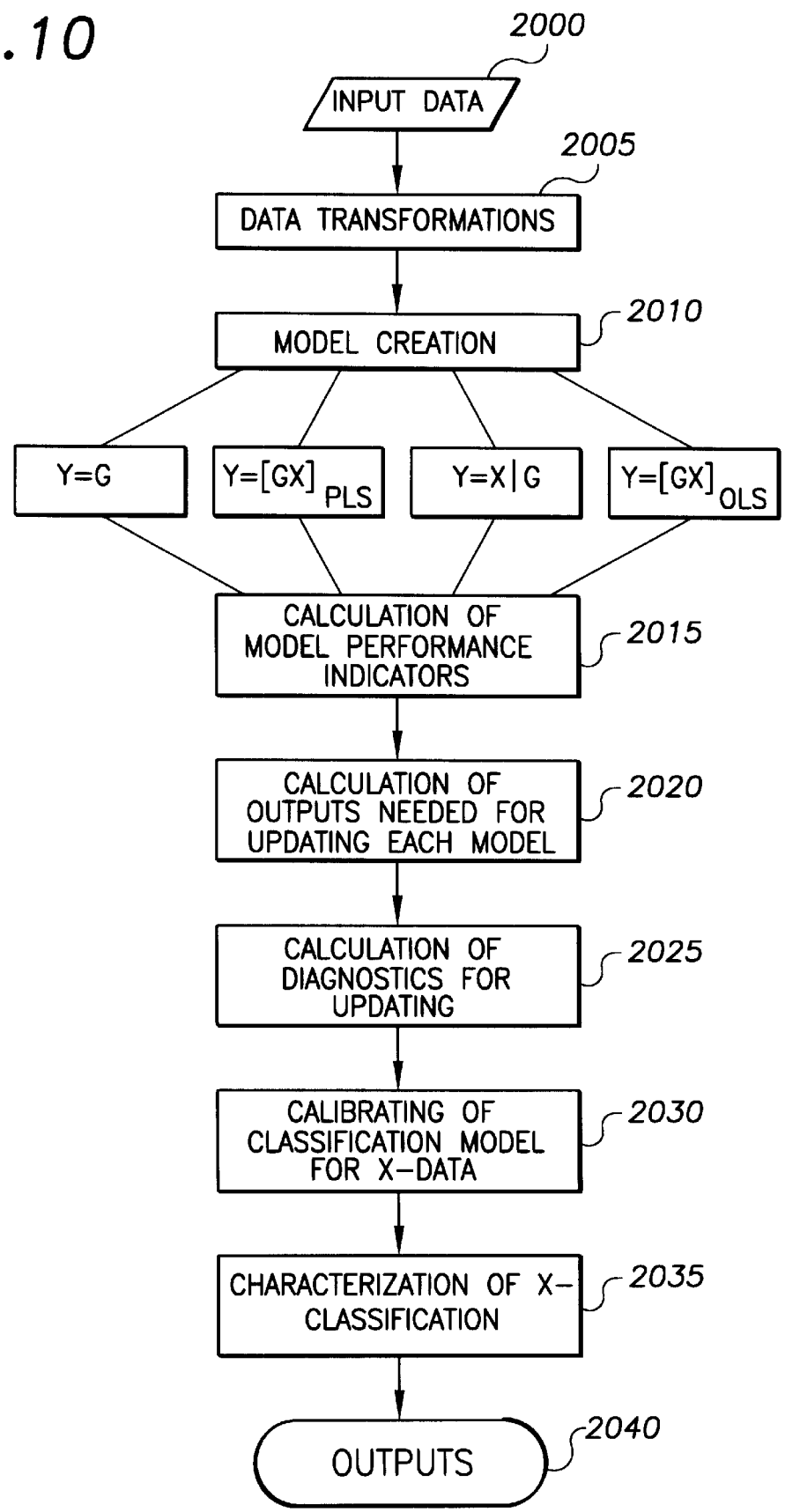
FIG. 10 is a flow chart detailing the modeling of two data sets with respect to one another in accordance with the method and system of the present invention.

Referring now to FIG. 10, calibration proceeds as follows.

First, the data matrices X and Y are entered into the digital computer program used to carry out the computational steps of the method and system of the present invention at INPUT 2000. For purposes of this description, it is assumed that any missing values have already been filled or estimated in accordance with the techniques described in Section 1.1 ("Filling of Missing Values") of the present application.

At the same time, it is also necessary to input: (1) whether any data transformations are to be performed, such as row-mean-centering of the Y data, centering, and/or scaling of the data matrices X and/or Y; (2) the classification matrix, G, from clustering, along with the vector, in, and the row indices of the outliers, which are denoted by out; (3) the scale ranges of the X-variables and the Y-variables; (4) the X-variables to use in constructing the models; (5) the X-variables to use to build the X-classifier; (6) an indicator as to whether or not the data is in integer form; (7) the integer, k, for in leave-k-out cross-validation of the PLS models; and (8) the confidence level for the X-classifier.

After the input of such data, the calibration proceeds and any appropriate data transformations are performed on the data matrices X and Y, including, for example, row-mean-centering or scaling, as indicated by BLOCK 2005, and the associated parameters are saved for updating. Specifically, these parameters include: a row-mean-centering parameter to indicate whether to row-mean-center new data; the means of $X_{in}$ and $Y_{in}$, as well as Xi and Yi, i=1,2, ... g, if centering is specified; and the scaling parameters for each model.

Next, the appropriate models are created, as indicated by BLOCK 2010. In the description of model creation that follows, let $Y_t$ represent the transformed $Y_{in}$ according to the predefined or preferred settings. In the case where no Y transformations are preferred, then $Y_t=Y_{in}$. $X_t$ is similarly defined, but, in the case where no X transformations are preferred, then $X_t$ differs from $X_{in}$ in that a column of ones is added to $X_{in}$ to form $X_t$. Also if the X data is non-centered and scaled then a column of ones is concatenated with the scaled $X_{in}$ to form $X_t$.

Additionally, in the case of two or more classes, the information in G is used in modeling $Y_{in}$. In other words, the classes are treated as predictor variables. In the case of two or more classes, let $G_t$ be G, but without its last column and transformed according to the data transformation options for X. If there is only one class, $G_t=G$, a column of ones.

In the preferred embodiment of the method and system of the present invention, the first three models are PLS models. Each of the PLS models require a cross-validation step to determine the optimal number of principal components.

The first model is denoted by Y=G. $Y_t$ is the response variable, and the predictor matrix is $G_t$.

The second model is denoted by $Y=[G\ X]_{PLS}$. The predictor matrix, $X_{aug}$, is a concatenation of $G_t$ and $X_t$ for two or more classes. If there is only one class, then $X_{aug}=X_t$.

The third model is denoted by Y=X|G. For a given classification of the Y data, assume that there are g groups, where g>1. For each i, if the number of elements in group i is greater than a predefined threshold, e.g., fifteen in the preferred embodiment described herein, then a group PLS model is formed with Xi as the predictor matrix and Yi as the response matrix. If there is only one group, then this model is the same as the second model, $Y=[G\ X]_{PLS}$.

The fourth model is denoted by $Y=[G\ X]_{OLS}$ and is always non-centered. Let $X_{OLS}$ be the analog of $X_{aug}$ for this model. Thus, in the case of non-centering, then $X_{OLS}=X_{aug}$. The regression matrix, $B_{OLS}$, is given by $B_{OLS}=(X_{OLS}'\ X_{OLS})+X_{OLS}'Y_t$. This model exists even when the regular OLS model between $X_{OLS}$ and $Y_t$ does not exist, i.e., when $(X_{OLS}'\ X_{OLS})^{-1}$ is undefined. Of course, when the latter is defined, then $Y=[G\ X]_{OLS}$ is the OLS model.

Returning to the flow diagram of FIG. 10, after model creation, model performance indicators are calculated, as indicated by BLOCK 2015. First, the RMSEC is calculated for each group within each model, yielding a 4× g matrix referred to as RMSEC, where RMSEC(i,j) is the RMSEC for group j using model i. The data matrix is saved for use in updating and querying, as will be further described below. Secondly, correlations between predicted and actual response variables are calculated for each Y-variable and for each model, but not on a group basis. Finally, the explained Y-variance of each model is calculated.

After model performance indicators are calculated, the calibration process proceeds to a calculation of the outputs needed for updating each model, as indicated by BLOCK 2020. These necessary outputs include: variance-covariance type matrices (e.g., $X_{aug}'\ X_{aug}$ and $X_{aug}'Y_t$ for the $Y=[G\ X]_{PLS}$ model); regression coefficient matrices for each model; number of principal components for each PLS model; and transformation parameters, such as scaling coefficients and means.

Then, as indicated by BLOCK 2025 of FIG. 19, outputs that are necessary for a diagnostic determination as to whether re-calibration is required after updating the data one or more times are calculated. Specifically, $m_Y$ and $m_X$, the respective means of $Y_{in}$ and $X_{in}$ are calculated, as are the respective covariance matrices, $S_X$ and $S_Y$. These outputs are used during updating to determine if the data means change significantly, using a 95% confidence level with the Hotelling $T^2$ statistic. Also, a copy of RMSEC, referred to as RMSEP, is saved for updating the RMSEP and comparing to RMSEC.

Returning to the flow diagram of FIG. 9, a classification model for X-data is calibrated, as indicated by BLOCK 2030. Specifically, a supervised classifier (e.g., SIMCA in the preferred embodiment described herein) is calibrated on X given by G at a specified confidence level. This calibrated classification model is then used in subsequent updating and querying processes.

Next, the calibration proceeds to a characterization of the X-classification as indicated by BLOCK 2035. Specifically, the following are calculated: (1) a measure of X-class separation, referred to as group distance, using SIMCA; (2) the modeling power of each X-variable for each group using SIMCA; and (3) a measure of the ability of the X-variables to discriminate between X-classes using both SIMCA and another sub-routine, i.e., alternate discriminatory power.

Finally, as indicated by OUTPUT 2040 of FIG. 10, various outputs are achieved. First, the calibration process outputs a vector, x_pred$_{rank}$, that is used for ranking the X-prediction variables in importance from the $Y=[G\ X]_{PLS}$ model. If B is the coefficient matrix for the latter model, then B(i,:) is the row of B corresponding to the ith X variable used in the modeling. The "score" given to this variable is the sum of the absolute value of the elements of B(i,:). Secondly, the calibration process outputs another vector, x_descrim$_{rank}$, that is used for ranking the X-classification variables for their so-called discriminatory power from the alternate discriminatory power method. Third and finally, the calibration process outputs the estimated condition number of the variance-covariance type matrix, $X_{OLS}'\ X_{OLS}$, for the $Y=[G\ X]_{OLS}$ model, along with an associated indicator, no$_{OLS}$. If no$_{OLS}$=1, the estimated condition number is greater than five hundred; otherwise, no$_{OLS}$=0.

2.3 Updating SIMCA

The SIMCA models created in the calibration process described above can be updated. To do so requires updating of the PCA models for each group which, in turn, requires updating each of the group covariance matrices. For example, let $X_i$ be the rows of X in group i from calibration, i=1,2, ... g. $C_i=X_i'*X_i$ is calculated during calibration and saved for updating for all i. Now, let Xu be the x-type data used in the first update, and let Xu$_i$ be the rows of Xu classified in group i during the update, i=1,2, ... g. Finally, let $m_x$ be the matrix of group means from calibration where mx(i,:) is the mean of group i, and let gsz(i) be the number of members of group i from calibration. The covariance matrix, Cov$_i$, for group i is then calculated as follows:

$$Cov_i = \frac{\frac{C_i}{gsz(i)} - m_x' * m_x}{\frac{gsz(i)-1}{gsz(i)}} \quad (30)$$

In the case of non-centered SIMCA, Cov$_i$ is set equal to $C_i/(gsz(i)-1)$. In the updating process, then $C_i$ is updated to $X_i'*X_i+Xu_i'*Xu_i$ for all i. In other words, $C_i \rightarrow C_i+Xu_i'*Xu_i$. Furthermore, gsz is also updated to reflect additional class members, and Cov$_i$ is calculated as before with the updated $C_i$ and gsz(i).

In the centered case, $m_x$ remains fixed from calibration. New loadings are the calculated, and the same number of principal components are used as were used in the calibration process. $C_i$ and gsz(i) continue to be updated in the same manner with subsequent input of new data.

Modeling power and discriminatory power can also be updated. As mentioned above, the modeling power ("MPOW") of variable j in group i is given by:

$$MPOW(i, j) = 1 - \sqrt{\frac{Ei(:,j)'E_i(:,j)}{\frac{(gsz(i)-A_i-1)}{Cov_i(j, j)}}} \quad (31)$$

where $A_i$ is the number of principal components in the PCA model for group i from calibration, and $E_i$ is the matrix of residuals from the model for group i. Thus, $$\text{resid}(i,j) \equiv E_i(:,j)'*E_i(:,j) = (1-MPOW(i,j))^2 Cov_i(j,j)(gsz(i)-A_i-1) \quad (32)$$

Now, let $Eu_i$ represent the residuals from the PCA model associated with $Xu_1$, then $resid(i,j) \rightarrow resid(i,j)+Eu_i(:,j)'*Eu_j(:,j)$. With MPOW input into the updating prodedure, it can be updated using the updated resid, Cov and gsz according to the above formula with $E_i(i:j)'*E_i(:,j)$ being replaced with the updated $resid(i,j)$.

Discriminatory power ("DPOW") can be similarly updated. Again, $E_{ij}$ represents the residuals when group i is projected onto group j. Now, let $S_{i,j}(k)=E_{i,j}(:,k)'E_{i,j}(:,k)/gsz(i)$ when $i \neq j$ and $S_{i,j}(k)=E_{i,j}(:,k)'E_{i,j}(:,k)/(gsz(i)-A_i-1)$ when $i=j$. The $S_{i,j}(k)$ are saved for all i,j,k in the current update or calibration to be used in the subsequent update. Finally, let $Eu_{i,j}$ represent the residuals corresponding to $Xu_i$ when the latter is projected onto the updated model for class j; let gszu represent the vector of cumulative group sizes for the current update; and let gsz represent the vector cumulative group sizes from the previous update or calibration, as the case may be. Then, $S_{i,j}(k)$ is updated according to:

$$S_{i,j}(k) \rightarrow (gsz(i)S_{i,j}(k)+Eu_{i,j}(:,k)'Eu_{i,j}(:,k))/gszu(i) \text{ for all } i,j,k \quad (33)$$

And, the discriminatory power of variable k to distinguish between groups i and j is:

$$DPOW_{i,j}(k) = \frac{S_{i,j}(k) + S_{j,i}(k)}{S_{i,i}(k) + S_{j,j}(k)} \quad (34)$$

2.4 Forgetting Factor; Recursive PLS and RLS

A fixed or variable forgetting factor can be used in the regression models $Y=G$, $Y=[G\ X]_{PLS}$, $Y=X|G$ and $Y=[G\ X]_{OLS}$. As mentioned above, the forgetting factor allows for a downweighting of old data, essentially discounting model history and assigning increased importance or weight to more recent data. For further explanation of forgetting factors, see, e.g., B. Dayal and J. MacGregor, "Recursive exponentially weighted PLS and its applications to adaptive control and prediction," 7 *J. Proc. Cont*, pps. 169–179 (1997), an article which is incorporated herein by this reference.

The Dayal-MacGregor article also describes a PLS algorithm (i.e., a method of calculating the scores matrix T, the weight matrix W and loadings matrices, P and Q) that is used in the preferred embodiment of the present invention, along with a method of updating it. In addition, this article details the standard recursive least squares (RLS) algorithm. The present invention also uses the a similar algorithm, except that instead of using the matrix inversion lemma, in the present invention, a generalized inverse is calculated, increasing the stability of the algorithm.

2.5 Updating

Figure 11:
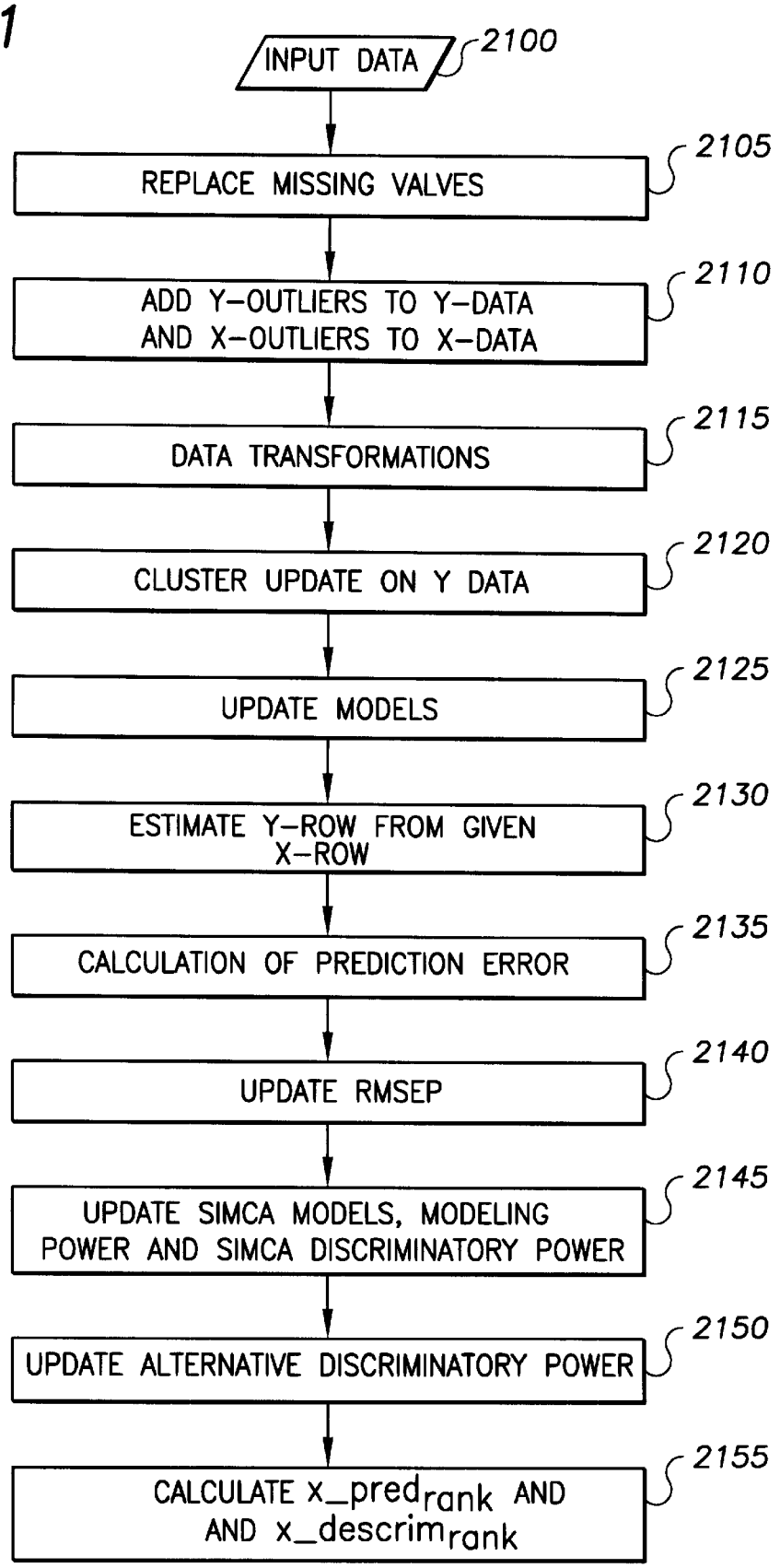
FIG. 11 is a flow chart detailing the updating of the model relating two data sets in accordance with the method and system of the present invention.

Referring now to FIG. 11, once the models have been created in the calibration process described above, these models can be updated. First, the data matrices X and Y are entered into the digital computer program used to carry out the computational steps of the method and system of the present invention at INPUT 2100.

At the same time, it is also necessary to input: (1) a prediction error tolerance indicator, which is a proportion or percentage such that if the RMSEP for the best model increases by more than this percentage from the calibration RMSEP, a notification is provided; (2) missing value indicators for Y data; (3) an indicator of whether to use fixed or variable forgetting; (4) a minimum forgetting factor when variable forgetting is used; and (5) user inputs for cluster updating, as described in Section 1.12 ("Updating") of the present application.

From the previous calibration and updating processes, as described above, the digital computer program used to carry out the computational steps of the method and system of the present invention already has saved certain necessary data and information, including (1) data transformation parameters from calibration; (2) outputs needed to update models, each of which is specifically referred to in Section 2.2 ("Calibration") of the present application with reference to BLOCK 2020 of FIG. 10; (3) parameters needed for X-classification and for the SIMCA model update; (4) parameters needed to update discriminatory power; and (5) inputs for cluster updating, as described in Section 1.12 ("Updating") of the present application.

Referring still to FIG. 11, after all necessary data and information has been entered, missing values are filled or estimated using the corresponding values from $Y_{best}$ from Section 2.6 ("Querying") of the present application, as indicated by BLOCK 2105. The Y-outliers are added to the new Y data, and corresponding X-outliers are added to the new X data, as indicated by BLOCK 2110. Then, the updating process continues and any appropriate data transformations are performed on the data matrices X and Y, including, for example, row-mean-centering or scaling, as indicated by BLOCK 2115. A cluster update, as described in Section 1.12 ("Updating") of the present application, is then performed on the filled Y data, as indicated by BLOCK 2120. If a new cluster is added in the cluster update, the updating process terminates with an assigned a value of one to a output referred to as addclus. If no new clusters were added, addclus maintains its default value of zero.

Next, as indicated by BLOCK 2125, the models are updated using cluster update classification, i.e., only the inliers are used to update each model. Models are updated one Y-row and corresponding X-row at a time. PLS models are updated using recursive-PLS routine, and the OLS model is updated using a recursive least squares algorithm. This is further described in Section 2.4 ("Forgetting Factor; Recursive PLS and RLS") of the present application.

The models are then used to estimate a Y-row based on a given X-row, as indicated by BLOCK 2130. After transforming the Y-estimate from the last step back to raw form, i.e., all of the data transformations are "reversed" so that the Y-estimate is on the original scale of the Y data. Thus, if the Y data was scaled and centered, then the Y-estimate is unscaled and the data center is added back in. The prediction error of each model is then calculated, as indicated by BLOCK 2135.

The RMSEP, SIMCA models, modeling power, and SIMCA discriminatory power are updated in the manner described in Section 2.3 ("Updating SIMCA") of the present application, as indicated by BLOCK 2140. The alternative discriminatory power model is also updated, as indicated by BLOCK 2145. Finally, new $x\_pred_{rank}$ and $x\_descrim_{rank}$ are calculated, as indicated by BLOCK 2155.

2.6 Querying

Figure 12:
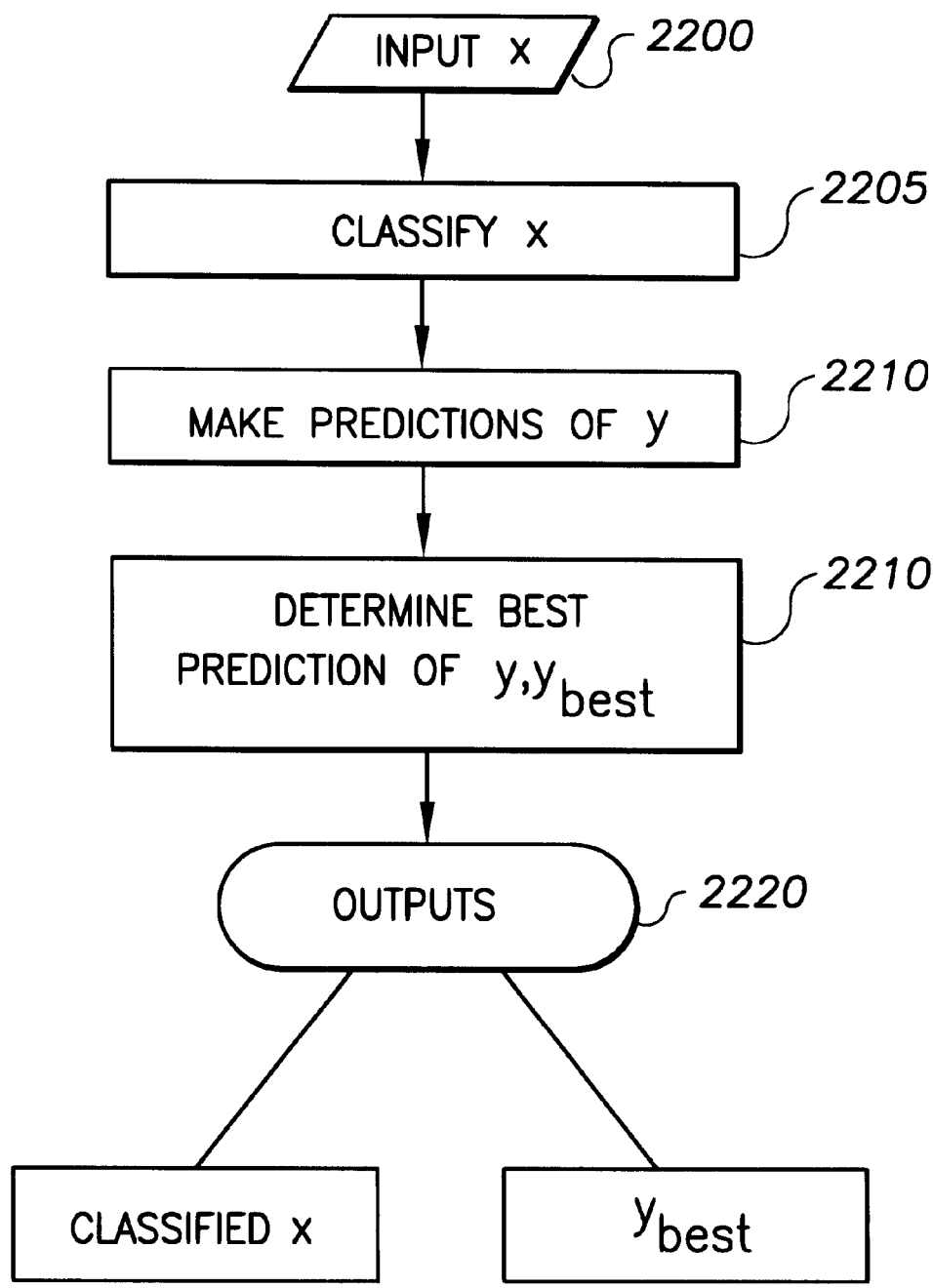
FIG. 12 is a flow chart detailing the querying of the model relating two data sets in accordance with the method and system of the present invention.

Referring now to FIG. 12, after calibration or updating, the models can be queried for prediction and classification of data. For example, the data vector x (or matrix X) is entered into the digital computer program used to carry out the computational steps of the method and system of the present invention at INPUT 2200. Of course, from the previous calibration and updating processes, as described above, the digital computer program already has saved certain necessary data and information associated to the X and Y data matrices and the relationship between them.

In the querying process, x is classified according to the X-classification (SIMCA) analysis described above, as indicated by BLOCK 2205. This classification is referred to as a. Then, using a and four models described in Section 2.2

("Calibration") of the present application with reference to BLOCK 2010 of FIG. 10, four predictions of y are made for each row of x, as indicated by BLOCK 2210 of FIG. 12. The best prediction for each row of x is then determined by selecting the prediction with the lowest RMSEP per group per model, as indicated by BLOCK 2215. This best prediction is referred to as vector $Y_{best}$ (or matrix $Y_{best}$).

As a result of such querying, the following outputs are achieved, as indicated at OUTPUT 2220 of FIG. 12: (1) a, the X-classification (SIMCA) of the input data vector x; and (2) $y_{best}$, the best prediction of y based on the input data vector x.

In summary, four models are created relating G to Y, or G and X to Y. In addition, a classification model of X is created that is based on: the clustering of Y; and X-class descriptors such as modeling power, group distance and discriminatory power. Each of these models and descriptors are capable of being updated with the input of new X-type and Y-type data. In the carbonated beverages example set forth at the outset of this application, X data was demographic and lifestyle data, while the Y data was product preference data. The Y clustering was imposed on the X data, such that a prediction of product preference could be made based on a give demographic and lifestyle profile.

3.0 Phase III—X and Z→Y, X→Z, Z→X Modeling

Referring again to FIG. 1, if a third data matrix Z that describes the column objects of Y, in the third phase, a relationship can developed between the X, Y and Z data matrices, which allows the method and system of the present invention to link X with Z through Y, as generally indicated by reference numeral 1010.

First, let X, Y and Z be real data matrices with dimensions n×q, n×p and p×a, respectively. The rows of these matrices are called points or objects. X and Y have the same number of rows, and the number of columns of Y equals the number of rows of Z. Then, let $\mathcal{D}_z$ be the set of possible row vectors for Z. $\mathcal{D}_y$ and $\mathcal{D}_x$ are as defined in Section 2.0 ("Phase II—X→Y Modeling") of the present application.

Through the computational steps described below, and in accordance with the method and system of the present invention, accurate prediction of the response y∈$\mathcal{D}_y$ is possible given x∈$\mathcal{D}_x$ and z∈$\mathcal{D}_z$. Furthermore, it is possible to relate the row objects of Y to the column objects of Y to find: (1) an optimal z∈$\mathcal{D}_z$ given x∈$\mathcal{D}_x$ or (2) an optimal x∈$\mathcal{D}_x$ given z∈$\mathcal{D}_z$. In the carbonated beverages example, x would be a vector of numerical answers to demographic and lifestyle questions, while z would be a vector of certain beverage attributes. y could be a predicted liking for a beverage by a consumer providing the answers x.

3.1 Building a Relationship Between X, Y and Z.

At the outset, it is important to recognize that the rows of X carry information about the rows of Y, and the rows of Z carry information about the columns of Y. Thus, the objective is to use the X and Z data to predict or model Y. A preferred method of achieving this begins with the construction of a mapping, X(i,:), Z(j,:)→Y(i,j) for each i and j:

$$Y(i,j)=f(X(i,:),Z(j,:))+\text{error for } i=1,2\ldots n; \text{ and } j=1,2,\ldots p \quad (35)$$

for some function, f. To construct f, it is first necessary to create a matrix XZ (which should not be confused with the matrix product of X and Z), where X(i,:) and Z(j,:) are concatenated for all i and j. For example, XZ(1,:) is X(1,:) adjoined to Z(1,:); XZ(2,:) is X(2,:) adjoined to Z(1,:); and XZ(n+1,:) is X(1,:) adjoined to Z(2,:). In general, XZ(n*(j−1)+i,:)=X(i,:) is concatenated with Z(j,:). Next, a regression method is used to construct a model, f, using XZ(n*(j−1)+ i,:) as a predictor and Y(i,j) as a response for all i and j. In this regard, the Y matrix can be "unfolded" so as to match XZ, i.e., Y could be transformed to a column vector, $Y_{col}$, where $Y_{col}(n*(j-1)+i)=Y(i,j)$. One such regression method is a feed-forward, back-propagation neural network. A second regression method, the method that is employed in the preferred embodiment described herein, is a point-wise, non-linear method, which is described in further detail below.

3.2 Point-wise Non-linear Modeling

First, let A be a n×q predictor matrix for a n×p response matrix, B. Through point-wise non-liner modeling, linear models are constructed for each data pair A(i,:) and B(i,:). These models are combined as explained below to form a typically non-linear regression model between A and B.

Now, let a ∈$\mathcal{D}_A$, where the latter is the set of all possible vectors of the type found in the rows of A. Let d be a vector of distances of a from all the rows of A, sorted from smallest to largest, and let ind be the corresponding row indices. For example, if A(20,:) is the closest to a of all the rows of A, then the first entry of d is the distance between a and A(20,:), and the first element of ind is 20.

To create the point models, $D_i$ is defined as:

$$D_i=(A(i,:)'A(i,:))^+A(i,:)'B(i,:) \text{ for } i=1,2,\ldots n \quad (36)$$

$D_i$ is thus a q×p matrix for all i=1,2, . . . n, and B(i,:)= A(i,:)$D_i$+error.

Now, for a given non-negative integer, m, assume none of the elements of d are zero, and define s, α(i), and $D_{a,m}$ as follows:

$$s = \sum_{i=1}^{m} 1/d(i) \quad (37)$$

$$\alpha(i)=d(i)^{-1}/s \text{ for } i=1,2,\ldots m \quad (38)$$

$$D_{a,m} = \sum_{i=1}^{m} \alpha(i)D_{ind}(i) \quad (39)$$

Assuming now that the first r elements of d are zero, then $$D_{a,m} = \sum_{i=1}^{r} D_{ind(i)}/r \quad (40)$$

$D_{a,m}$ is a q×p matrix. The model prediction for a given m then is therefore yest=a$D_{a,m}$.

Lastly, a leave-k-out cross-validation is run over a range of potential m-values to find the optimal m, mopt.

The above modeling technique thus requires that the set $\{Di\}_{i=1}^{n}$, mopt and A to find the mopt closest rows to a given input a. mopt is the number of point-models to combine in equation (39) to make a model for a given input. For purposes of further description, A is referred to as the reference matrix, $\{Di\}_{i=1}^{n}$ represents the point models, and mopt is the combination number. This modeling technique can be used "as is," or it can be "reduced" or "smoothed" using various approaches.

In one example of such a reduction or smoothing approach, a data partitioning method is used to partition a concatenation of A and B into u clusters or groups. Let w_u be the matrix of the u weights or cluster averages. Then, $$D_i^{red}=D_{w\_u(i,:),mopt} \text{ for } i=1, 2, \ldots u \quad (41)$$

The above model is then validated using the predicted y-values from the non-reduced model and performing a leave-k-out cross-validation (in the preferred embodiment described herein), or, alternatively, by performing a test validation using the full A and B.

Now, let mopt_u be the optimal number of point-wise models to combine. Since this reduction or smoothing approach can be performed over a range of different partition numbers, u, let uopt be an optimal partitioning in terms of giving the lowest prediction error when the model is applied to A to predict B.

After the reduction or smoothing process, the model consists of the point models, $\{D_i^{red}\}_{i=1}^{uopt}$, the combination number, mopt_uopt, and the reference matrix, w_uopt. If the model is to be updated, then it is the cluster sizes of the optimal clustering (i.e., uopt clusters) are also required. In this regard, let gsz be the vector of group sizes where gsz(i)=size of cluster associated with w_uopt(i,:) for i =1,2, . . . . uopt. In the case of the full model, gsz(i)=1 for all i.

Returning to the description of point-wise on-liner modeling above, let the reference matrix A=XZ, and let B=$Y_{col}$. Now, let $\{Di\}_{i=1}^n$ be the associated point models, and let mopt be the associated combination number. If x $\in \mathcal{D}_x$ and z $\in \mathcal{D}_z$, let xz=[x z]. Then f(x,z)=xz*$D_{xz,mopt}$, where $D_{xz,mopt}$ is constructed from $\{Di\}_{i=1}^n$ as described above.

3.3 Clustering Method For Smoothing

Since the initial XZ matrix can be very large, making model predictions can be exceedingly time-consuming. Therefore, a reduced model can be made to increase speed without a great sacrifice in accuracy. And, as discussed above, a partitioning method may be used to create a new reference matrix $XZ_{red}$ from XZ.

First, XZ and Y, the point models and the combination number are input into the digital computer program used to carry out the computational steps of the method and system of the present invention. Pertinent data transformation parameters, an iteration number for the SOM, a cluster range, and a cutoff number are also entered.

Assume that XZ is transformed according to the "full" model, e.g., if is was specified that XZ be scaled initially, then the XZ matrix used to make $XZ_{red}$ is also scaled. The program iterates over the cluster range attempting to find an optimal reduced model based on prediction accuracy.

Now, for a given cluster number j, with all weights starting at the median of XZ, a SOM with a Euclidean metric is applied to XZ, and then run over the input number of iterations. The learning parameter, α, has an initial value of 0.9 and is updated according to $\alpha_{t+1}=max(\alpha_t/(1+a_t),0.02)$, where t refers to the iteration number. The SOM outputs j weights, and the number of points of XZ associated with each weight is calculated. Each weight that has no associated points is deleted.

Next, the "weeded" resultant weights from the SOM are input into a k-means routine as initial weights. The k-means weights are also inspected for empty clusters and trimmed accordingly. The resultant weights are then taken to be $XZ_{red,j}$ and are input into the XZ→$Y_{col}$ model, thereby giving the model predictions, $Y_{pred,j}$. Thus, the model, $XZ_{red,j}→Y_{pred,j}$ is created.

Finally, XZ is input into the model, $XZ_{red,j}→Y_{pred,j}$, and the resulting predictions compared to $Y_{col}$. The resulting prediction error is saved.

In some circumstance, after a certain number of clusters, the models do not change. For example, suppose the cluster range is 25 to 100. Further suppose that different models are made for cluster numbers 25 through 50, but that models 50, 51, 52, 53, . . . are identical because the SOM and k-means are unable to form any more than 50 non-empty clusters. In other words, all subsequent clusters are empty and are consequently removed. The above-mentioned cutoff number is used to terminate the process in such circumstances. In the preferred embodiment described herein, the cutoff number is four so that, in the above example, the process terminates at j=55, i.e., when the number of consecutive identical models exceeds the cutoff number.

Quite obviously, the reduced model with the lowest prediction error is used for XZred→Ypred. In other words, if the lowest prediction error occurs at j* then the model $XZ_{red,j*}→Y_{pred,j*}$ is selected for the reduced model, and that model is output.

3.4 Optimization

Optimization typically refers to function minimization or maximization, specifically, what value(s) of the function domain gives the global (as opposed to local) maximum or minimum of the function. The function to be minimized/maximized is referred to as the objective function. In some cases, the optimization solution can be calculated analytically. Often, however, this is not the case. Therefore, search routines have been developed that attempt to find an optimum. Performance of these routines for a given objective function varies in both time and accuracy. In the current context, it is assumed that optimization refers to function minimization, in that that the objective is to maximize f: XZ→$Y_{col}$. Since the objective function is −f, maximizing f is equivalent to minimizing −f.

In the preferred embodiment of the present invention described herein, an optimization routine called SIMPS is employed. This optimization routine was developed by Zeljko Bajzer and Ivo Penzar of the Mayo Clinic and Foundation, Rochester, Minn., USA; SIMPS is available on the Internet through the MathWorks™ web site at http://www.mathworks.com. Similar to other such optimization routines, SIMPS requires inputs of the objective function; a starting point, $x_0$, from which to begin searching for the minimum; and the variable constraints, i.e., the lower and upper bounds of the domain variables. In addition, SIMPS allows for the option of holding specified variables fixed during the search routine, which is useful in finding an optimal z$\in \mathcal{D}_z$ given x$\in \mathcal{D}_x$, or an optimal x$\in \mathcal{D}_x$ given z$\in \mathcal{D}_z$. For example, to z$\in \mathcal{D}_z$ given x$\in \mathcal{D}_x$, it can be specified that the x variables in the mapping f x,z→y are held fixed. This effectively creates a new function, $f_x$, such that $f_x$:z→y with corresponding objective function −$f_x$. The search routine is then conducted solely over the z domain (defined by the constraints) to try to minimize −$f_x$.

3.5 Calibration

Figure 13:
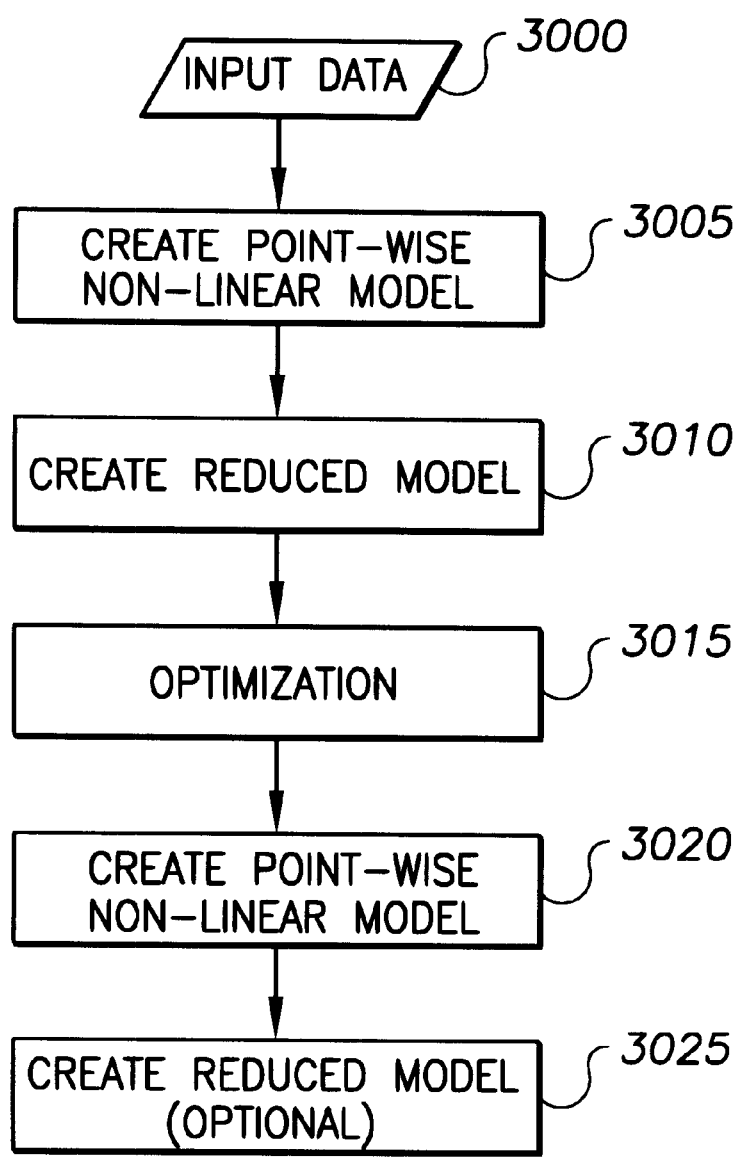
FIG. 13 is a flow chart detailing the calibration of a model relating three data sets with respect to one another in accordance with the method and system of the present invention.

Referring now to FIG. 13, during the calibration process, as many as six models are constructed depending on the inputs. For purposes of the following discussion, four models are discussed and denoted by $Y_{col}=XZ_{full}$, $Y_{col}=XZ_{red}$, XorZ=ZorXopt$_{full}$, and XorZ=ZorXopt$_{red}$, as will be described further below.

Various inputs are required in this stage, as indicated at INPUT 3000 of FIG. 13, and thus are best represented in tabular form:

TABLE B

| INPUTS | |
|---|---|
| (a) Point-wise XZ→Y$_{col}$ model. | X, Y and Z |
| | Classification of Y-rows, if any. |
| | Rows of X and Y to use in the model. |
| | X- and Z-variables to use in the prediction models. |
| | Cross-validation level and range for overall XZ→Y$_{col}$ model. |
| | Data transformation options. |
| (b) Reduced XZ→Y$_{col}$ model. | Cluster range. |
| | Iteration number for SOM. |
| | Model parameters from overall model. |
| (c) Optimization Inputs. | Lower and upper bounds/constraints for optimization. |
| | Variables to hold fixed (X- or Z-variables). |
| | Model parameters from reduced XZ→Y$_{col}$ model. |
| | Data. |
| (d) x→zopt or z→xopt model(s). | Data (including optimization results). |
| | Cross-validation level and range for full model. |
| | Data transformation options. |
| | Whether to make the model from Y$_{col}$ = XZ$_{full}$. |
| (e) x→zopt or z→xopt reduced model(s). [Optional] | Cluster range. |
| | Iteration number for SOM. |
| | Model parameters from overall model. |

Referring still to FIG. 13, once the necessary data and information has been input, an overall point-wise non-linear XZ→Y$_{col}$ model (Y$_{col}$=XZ$_{full}$) is constructed, as indicated by BLOCK 3005. In this regard, XZ is constructed from X and Z, and Y$_{col}$ is constructed from Y. Next, any appropriate data transformations are performed on the data matrices XZ and Y$_{col}$, including, for example, row-mean-centering or scaling. Finally, the point-wise non-linear XZ→Y$_{col}$ is created as described in Section 3.2 ("Point-wise Non-linear Modeling") of the present application using cross-validation, thereby yielding outputs: transformed XZ; $\{Bi\}_{i=1}^n$; m$_{opt}$, the number of point-models to combine to make a prediction for a given input; and data transformation parameters.

The calibration process then proceeds, and a reduced or smoothed model, Y$_{col}$=XZ$_{red}$ is created from Y$_{col}$=XZ$_{full}$ as is described in Section 3.2 ("Point-wise Non-liner Modeling") and in Section 3.3 ("Clustering Method for Smoothing") of the present application. This yields outputs: XZ$_{red}$, the optimal "weight" matrix from the clustering of XZ; $\{B_i^{red}\}_{i=1}^{uopt}$; and m$_{opt}$_red, the number of point-models to combine to make a prediction for a given input with uopt representing the number of rows of XZ$_{red}$.

Then, the optimization routine is applied to Y$_{col}$=XZ$_{red}$ and Y$_{col}$=XZ$_{full}$ as is described in Section 3.4 ("Optimization") of the present application and indicated by BLOCK 3015 of FIG. 13. Specifically, if the optimal z∈𝒟$_z$ for a given x∈𝒟$_x$ is desired, then the X-variables are held constant in the optimization routine, and X$_{in}$ is input, thereby yielding outputs Zopt$_{red}$ and Zopt$_{full}$. If the optimal x∈𝒟$_x$ for a given z∈𝒟$_z$ is desired, then the Z-variables are held constant is in the optimization routine, and Z is input, again yielding outputs Xopt$_{red}$ and Xopt$_{full}$.

Next, XorZ=ZorXopt$_{full}$ type models are created. Specifically, a point-wise non-linear model(s) between X$_{in}$ or Z and the optimization results is constructed as is described in Section 3.2 ("Point-wise Non-linear Modeling") according to the predefined data transformations, as indicated by BLOCK 3020 of FIG. 13.

The notation XorZ=ZorXopt$_{full}$ is an attempt to describe the two possible situations: (1) creation of models between X$_{in}$ and Zopt$_{red}$ and X$_{in}$ and Zopt$_{full}$; and (2) creation of models between Z and Xopt$_{red}$ and Z and Xopt$_{full}$. From this, necessary model parameters are output.

Finally, if desired, XorZ=ZorXopt$_{red}$ type models are created, and the necessary model parameters, including group sizes, are output, as indicated by BLOCK 3025.

3.6 Updating Non-linear Point-wise Models

A given non-linear point-wise model, referred to as MOD, is to be updated. Let a ∈𝒟$_A$ and b ∈𝒟$_B$, where 𝒟$_B$ is defined similarly to 𝒟$_A$. If MOD is a full model, it can be updated by first calculating the point model coefficients:

$$D_{n+1}=(a'a)^+a'b \qquad (42)$$

as in equation (36) described above in Section 3.2 ("Point-wise Non-liner Modeling"). This result is added to $\{Di\}_{i=1}^n$ to get $\{Di\}_{i=1}^{n+1}$. Then, a is concatenated with A using the combination number mopt. Of course, using this model could be computationally expensive if many updates were necessary. Therefore, in the preferred embodiment of the present invention described herein, a different updating method is employed.

First, it is assumed that a full or reduced model exists. Again, a ∈𝒟$_A$ and b ∈𝒟$_B$. Then, let A be the full or reduced reference matrix, $\{Di\}_{i=1}^n$ the point models, mopt the combination number, and gsz the vector of groups sizes. $D_{n+1}$ is then calculated as in equation (42).

Now, let k*=min(argmin$_j$ d$_E$(a,A(j,:))), where d$_E$ is the Euclidean metric. Thus, k* is the row of A that is closest to a, and with the lowest row number (in the case of a tie). Then, $D_{k^*}$ is updated as the weighted average of $D_{k^*}$ and $D_{n+1}$:

$$D_{k^*}^{update} = \frac{gsz(k^*)^* D_{k^*} + D_{n+1}}{gsz(k^*) + 1} \quad (43)$$

Similarly, the reference matrix is adjusted for a:

$$A(k^*, :)_{update} = \frac{gsz(k^*)^* A(k^*, :) + a}{gsz(k^*) + 1} \quad (44)$$

Finally, gsz is updated:

$$gsz(k^*)_{update} = gsz(k^*) + 1 \quad (45)$$

Again, this is the preferred method of updating the "reduced" nonlinear, point-wise models in the present invention.

3.7 Updating

In this context, the purpose of updating is to adjust the non-linear models created in calibration to incorporate new X, Y and Z data.

Figure 14:
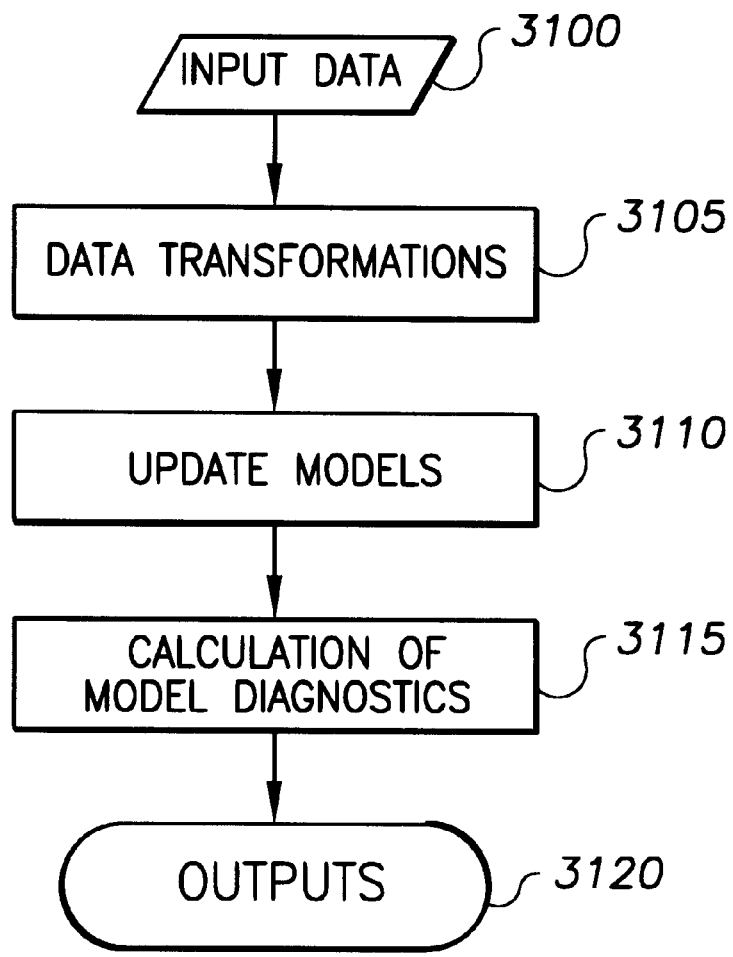
FIG. 14 is a flow chart detailing the optimization and updating of a model relating three data sets with respect to one another in accordance with the method and system of the present invention.

Referring now to FIG. 14, the four calibration models described above ($Y_{col}=XX_{full}$, $Y_{col}=XZ_{red}$, $XorZ=ZorXopt_{full}$, and $XorZ=ZorXopt_{red}$) can be updated. First, the new data matrices $X_{new}$ and $Y_{new}$ are entered into the digital computer program used to carry out the computational steps of the method and system of the present invention at INPUT 3100.

At the same time, it is also necessary to input classification information on the new data, including inlier and outlier indices, as well as cluster number for each row of $X_{new}$ and $Y_{new}$.

From the previous calibration process described above, the digital computer program used to carry out the computational steps of the method and system of the present invention already has saved certain necessary data and information, including: data transformation parameters, variable selection numbers, the various model parameters, and model diagnostics.

Referring still to FIG. 14, after all necessary data and information has been entered, the new data and the Z matrix is transformed according to the calibration inputs on a per model basis, an indicated by BLOCK 3105. The models are then updated in the manner described above in Section 3.6 ("Updating Non-linear Point-wise Models") of the present application, an indicated by BLOCK 3110.

Finally, the model diagnostics, including prediction error, are calculated as indicated by BLOCK 3115, and the updated models are output along with the diagnostic information at OUTPUT 3120.

3.8 Querying

In this context, querying refers to use of one or more of the models to predict an optimal $z \in \mathcal{D}_z$ given $x \in \mathcal{D}_x$, or an optimal $x \in \mathcal{D}_x$ given $z \in \mathcal{D}_z$.

Any of the output models can be queried but the processes involved and the potential answers depend on the model. Both $Y_{col}=XZ_{full}$ and $Y_{col}=XZ_{red}$ can be queried in the same manner, but querying these models does require the optimization described in Section 3.4 ("Optimization") of the present application.

First, through an appropriate input, an indication is made as to whether a determination of zopt for a given x, or xopt for a given z is desired. In the first case, the optimization routine holds the x-variables constant while searching over the z-variables. In the latter case, the optimization routine holds the z-variables constant while searching over the x-variables. In contrast the $XorZ=ZorXopt_{full}$ and $XorZ=ZorXopt_{red}$ models are strictly non-linear prediction models and can either (depending on the calibration inputs) predict zopt for a given x, or predict xopt for a given z, but not both. Thus, if in calibration, models were generated to find zopt for a given x, then the XorZ=ZorXopt-type models can not be used to predict xopt for a given z. This is similar to the linear regression models described in Section 2.2 ("Calibration") of the present application. These models only go "one way." For example, in the model $Y=[G\ X]_{PLS}$, one can input "class" and an "x" to predict a "y"; however, the model will not predict the "class" and "x" given the "y." The advantage of the XorZ=ZorXopt models is that the output or prediction is essentially instantaneous whereas using optimization can be "slow."

In summary, models relating X and Z to Y are created, and then, in conjunction with an optimization routine, these models are used to relate X-type data and Z-type data. These models can also be updated to incorporate new X, Y and Z information and can be queried.

As a final note, and as mentioned above, most of the computational steps of the method and system of the present inventions, including calibration and updating, are carried out behind the scenes. Once the appropriate models have been created, however, it is contemplated and preferred that a user-friendly interface be employed to allow querying of the models by interested users. For example, an interested user may submit a query through an Internet web browser installed on a personal computer operably connected to a computer network (e.g., the Internet), the model and data associated therewith being stored and maintained on a computer server also operably connected to the computer network.

It will be obvious to those skilled in the art that modifications may be made to the embodiments described above without departing from the spirit and scope of the present invention.

What is claimed is:

1. A method for the dynamic analysis of a first data matrix with a data structure comprised of row objects and column objects, wherein the row objects of said first data matrix can be related to a second data matrix with a data structure comprised of the same row objects and independent column objects, comprising the steps of:

performing a cluster analysis on said first data matrix to segment said data matrix into two or more row clusters;

creating two or more cluster membership prediction models, each of said cluster membership prediction models defining the relationship of the second matrix to a particular row cluster of the first data matrix, such that subsequent submission of data representative of an unknown row object with the data structure of the second matrix allows for a prediction of the particular row cluster of the first data matrix; and dynamically updating said at least two cluster membership prediction models with one or more new row objects having the column data structure of said first data and second matrices, provided that said new row objects are not identified as outliers, and without performing a new cluster analysis on the existing row objects of said first data matrix.

2. The method as recited in claim 1, in which said cluster analysis comprises the following substeps:

generating at least distinct two cluster analysis models, each of which segment said first data matrix into two or more row clusters; and identifying the cluster analysis model which most accurately predicts whether an unknown row object with the data structure of said second matrix has membership in particular row cluster or is an outlier.

3. The method as recited in claim 2, and further comprising the step of:

dynamically updating said at least two cluster analysis models with one or more new row objects having the data structure of said first data matrix, provided that said new row objects are not identified as outliers.

4. The method as recited in claim 1, and further comprising the step of:

identifying the cluster membership prediction model which most accurately predicts the particular row cluster of the first data matrix based on the submission of data representative of an unknown row object with the data structure of the second matrix.

5. The method as recited in claim 1, and further comprising the step of:

creating two or more value prediction models, each of said value prediction models defining the relationship of the second matrix to said first data matrix, such that subsequent submission of column values in said second data matrix of a row object allows for a prediction of the column values in said first data matrix.

6. The method as recited in claim 5, and further comprising the step of:

dynamically updating said at least two value prediction models prediction models with one or more new row objects having the column data structure of said first data and second matrices, provided that said new row objects are not identified as outliers.

7. The method as recited in claim 5, in which said computational steps are accomplished through execution of a digital computer program, each of said data matrices and subsequent data submissions being entered into said digital computer program.

8. The method as recited in claim 7, in which said value prediction models are accessed via a computer network, thereby allowing an end user to submit data representative of column values in said second data matrix of a row object allows for a prediction of the column values in said first data matrix.

9. The method as recited in claim 1, in which said computational steps are accomplished through execution of a digital computer program, each of said data matrices and subsequent data submissions being entered into said digital computer program.

10. The method as recited in claim 9, in which said cluster membership prediction models are accessed via a computer network, thereby allowing an end user to submit data representative of an unknown row object with the data structure of the second matrix for a prediction of the particular row cluster of the first data matrix.

11. A method as recited in claim 1, wherein:

each of the row objects of said first data matrix is a consumer respondent to a research study; and each of the column objects of said first data matrix is a product concept statement that one or more of the consumer respondents have evaluated.

12. A method as recited in claim 1, wherein:

each of the row objects of said first data matrix is a consumer respondent to a research study; and each of the column objects of said first data matrix is an actual consumer product that one or more of the consumer respondents have evaluated.

13. A method for the dynamic analysis of a first data matrix with a data structure comprised of row objects and column objects, wherein the row objects of said first data matrix can be related to a second data matrix with a data structure comprised of the same row objects and independent column objects, and wherein the column objects of said first data matrix can be related to a third data matrix with a data structure comprised of the same column objects and independent row objects, comprising the steps of:

generating a family of piecewise, non-linear prediction models defining the response surface model relationships between said second and third data matrices and said first data matrix over respective domain spaces covering possible values from the combinations of said row objects and said column objects;

using at least one of the piecewise, non-linear prediction models to selectively predict:

an optimal value of the column objects of the second matrix, or an optimal value of the row objects of said third data matrix, that maximizes or minimizes a predicted scalar value of said first data matrix while holding constant one or more selected values of the column objects of said second matrix; or one or more selected values of the column objects of said third matrix;

dynamically generating new piecewise, linear models extending the domain space of possible values of the combinations of the column objects of said second data matrix and the row objects of said third data matrix with new data having:

the same column data structure of said second data matrix, the same row data structure of said third data matrix, and a response value representing the same measure from the elements of said first data matrix; and dynamically updating at least one of the piecewise, non-linear prediction models with new data having:

the same column data structure of said second data matrix, the same row data structure of said third data matrix, and a response value representing the same measure from the elements of said first data matrix.

14. A method as recited in claim 13, and further comprising the steps of:

generating at least two distinct two cluster analysis models, each of which segment said first data matrix into two or more row clusters;

identifying the cluster analysis model which most accurately predicts whether an unknown row object with the data structure of said second matrix has membership in particular row cluster or is an outlier;

using one or more of said cluster analysis models to predict the cluster membership of an unknown row object with the data structure of said second matrix has membership in particular row cluster or to identify said unknown row object as an outlier;

using said cluster membership prediction in the generation of said piecewise, non-linear response surface models; and dynamically updating said cluster analysis models with one or more new row objects having the same column data structure as said first data matrix, provided that said new row objects are not identified as outliers, and without performing a new cluster analysis on the existing row objects of said first data matrix.

15. A method as recited in claim 13, wherein:

each of the row objects of said first data matrix is a consumer respondent to a research study; and each of the column objects of said first data matrix is a product concept statement that one or more of the consumer respondents have evaluated.

16. A method as recited in claim 15, wherein:

said first data matrix represents common numerical measures from the evaluation of each product concept statement by each consumer respondent;

said second data matrix represents common numerical measures that describe each consumer respondent; and said third data matrix represents common numerical measures that describe the evaluated product concept statements.

17. A method as recited in claim 13, wherein:

each of the row objects of said first data matrix is a consumer respondent to a research study; and each of the column objects of said first data matrix is an actual consumer product that one or more of the consumer respondents have evaluated.

18. A method as recited in claim 17, wherein:

said first data matrix represents common numerical measures from the evaluation of each actual consumer product by each consumer respondent;

said second data matrix represents common numerical measures that describe each consumer respondent; and said third data matrix represents common numerical measures that describe the evaluated actual consumer products.

19. The method as recited in claim 13, in which said computational steps are accomplished through execution of a digital computer program, each of said data matrices and subsequent data submissions being entered into said digital computer program.

20. The method as recited in claim 19, in which said value prediction models are accessed via a computer network, thereby allowing an end user to submit data representative of column values in said second data matrix of a row object allows for a prediction of the column values in said first data matrix.

* * * * *